United States Patent [19]
Stevens et al.

[11] Patent Number: 6,017,628
[45] Date of Patent: *Jan. 25, 2000

[54] METAL-COATED SUBSTRATE ARTICLES RESPONSIVE TO ELECTROMAGNETIC RADIATION, AND METHOD OF MAKING AND USING THE SAME

[75] Inventors: Ward C Stevens, New Fairfield; Edward A. Sturm, New Milford, both of Conn.

[73] Assignee: Alliant Defense Electronics Systems, Inc., Hopkins, Minn.

[*] Notice: This patent is subject to a terminal disclaimer.

[21] Appl. No.: 08/776,216

[22] PCT Filed: Jul. 11, 1995

[86] PCT No.: PCT/US95/09407

§ 371 Date: Jan. 8, 1997

§ 102(e) Date: Jan. 8, 1997

[87] PCT Pub. No.: WO96/01912

PCT Pub. Date: Jan. 25, 1996

Related U.S. Application Data

[60] Continuation-in-part of application No. 07/734,199, Jul. 22, 1991, Pat. No. 5,328,717, which is a division of application No. 07/448,252, Dec. 11, 1989, Pat. No. 5,034,274.

[51] Int. Cl.[7] ....................................................... B32B 15/00
[52] U.S. Cl. ....................... 428/381; 428/315.9; 428/378; 428/433; 428/469; 428/472; 342/12; 205/119; 205/162; 205/164; 205/184; 205/186
[58] Field of Search ................................. 428/315.9, 378, 428/381, 433, 469, 472; 342/12; 205/119, 162, 164, 184, 186

[56] References Cited

U.S. PATENT DOCUMENTS 2,818,351  12/1957  Nack et al. ............................... 117/107
2,862,783  12/1958  Drummond ................................. 18/54

(List continued on next page.)

FOREIGN PATENT DOCUMENTS 6065179  4/1985  Japan .

OTHER PUBLICATIONS

Butters, Brian C. F., "Electronic Countermeasures/Chaff," IEEE Proceedings, vol. 129, Part F, No. 3, Jun. 1982, pp. 197–201.

Mack, C.L. Jr. and B. Reiffen, "RF Characteristics of Thin Dipoles," IEEE Proceedings, vol. 52, May 1964, pp. 533–542.

Van Vleck, J. H. et al., "Theory of Radar Reflection from Wires of Thin Metallic Strips," Journal of Applied Physics, vol. 18, Mar. 1947, pp. 274–294.

Grant, P. M. et al., "Introduction to Electronic Warfare," IEE Proc., vol. 129, Prt. F., No. 3, Jun. 1982, pp. 113–132.

Wickliff, R. G. and R. J. Garbacz, "The Average Backscattering Cross Section of Clouds of Randomized Resonant Dipoles," IEEE Trans. AP 22, May 1974, pp. 503–505.

*Primary Examiner*—Deborah Jones
*Assistant Examiner*—Cathy Lam
*Attorney, Agent, or Firm*—Steven J. Hultquist

[57] ABSTRACT

An article (130) comprising a non-conductive substrate (136), preferably of an environmentally degradeable character, having a thickness of an oxidizable metal coating (138) thereon, and optionally an oxidation enhancingly effective amount of a salt (140), e.g., from about 0.005 to about 25% by weight of salt, based on the weight of oxidizable metal, present on the oxidizable metal coating. Also disclosed is a related method of forming such article, comprising chemical vapor depositing the oxidizable metal coating on the substrate. When utilized in a form comprising fine-diameter substrate elements such as filaments, the resulting product may be usefully employed as an "evanescent" chaff. In the presence of atmospheric moisture, such evanescent chaff undergoes oxidization of the oxidizable metal coating so that the conductivity and radar absorbance/reflectance characteristics of the chaff transiently decays. The chaff may be packaged for use in a cartridge (120) or the chaff may be provided by precursor roving packages (204) which are cut to the desired dipole length by a suitable cutter device (200) for dissemination to the locus of use.

22 Claims, 23 Drawing Sheets

U.S. PATENT DOCUMENTS

| | | | |
|---|---|---|---|
| 2,920,981 | 1/1960 | Whitehurst | 117/71 |
| 2,930,105 | 3/1960 | Budd | 28/80 |
| 3,097,941 | 7/1963 | Toulmin, Jr. | 65/3 |
| 3,129,487 | 4/1964 | Whitacre et al. | 18/75 |
| 3,221,875 | 12/1965 | Paquette | 206/65 |
| 3,372,051 | 3/1968 | Stalego | 117/69 |
| 3,544,997 | 12/1970 | Turner et al. | 343/18 |
| 3,549,412 | 12/1970 | Frye et al. | 117/100 |
| 3,725,927 | 4/1973 | Fielder | 343/18 |
| 3,765,931 | 10/1973 | Kyri et al. | 117/129 |
| 3,952,307 | 4/1976 | Nagler | 343/18 |
| 3,958,066 | 5/1976 | Imamura et al. | 428/372 |
| 4,052,530 | 10/1977 | Fonzi | 428/469 |
| 4,556,507 | 12/1985 | Tomibe et al. | 252/518 |
| 4,738,896 | 4/1988 | Stevens | 428/315.9 |
| 4,759,950 | 7/1988 | Stevens | 427/55 |
| 4,852,453 | 8/1989 | Morin | 89/1.11 |
| 4,859,499 | 8/1989 | Savinet et al. | 427/108 |
| 4,942,090 | 7/1990 | Morin | 428/367 |
| 5,034,274 | 7/1991 | Stevens et al. | 428/469 |
| 5,039,990 | 8/1991 | Stevens et al. | 342/12 |
| 5,087,515 | 2/1992 | Stevens et al. | 428/315.9 |
| 5,129,323 | 7/1992 | Park | 102/293 |
| 5,328,717 | 7/1994 | Stevens et al. | 427/126.2 |
| 5,352,519 | 10/1994 | Stevens et al. | 428/389 |
| 5,686,178 | 11/1997 | Stevens et al. | 428/336 |

FIG. 19

METAL-COATED SUBSTRATE ARTICLES RESPONSIVE TO ELECTROMAGNETIC RADIATION, AND METHOD OF MAKING AND USING THE SAME

CROSS-REFERENCE TO RELATED APPLICATIONS, IN RESPECT OF PRIORITY OF UNITED STATES AND OTHER PCT DESIGNATED STATES AFFORDING CORRESPONDING PRIORITY

This application is a continuation-in-part of U.S. application Ser. No. 07/734,199 filed Jul. 22, 1991, and issued Jul. 12, 1994 as U.S. Pat. No. 5,328,717, which is a division of U.S. application Ser. No. 07/448,252 filed Dec. 11, 1989, now U.S. Pat. No. 5,034,274. U.S. application Ser. No. 07/448,252 was co-filed with the following related applications, all assigned to the assignee hereof: U.S. application Ser. No. 07/449,708 filed Dec. 11, 1989 in the names of Ward C. Stevens, Edward A. Sturm, and Delwyn F. Cummings, for "GALVANICALLY DISSIPATABLE EVANESCENT CHAFF FIBERS, AND METHOD OF MAKING THE SAME," issued as U.S. Pat. No. 5,039,990; U.S. application Ser. No. 07/450,585 filed Dec. 11, 1989 in the names of Ward C. Stevens, Edward A. Sturm, and Bruce C. Roman for "SULFURIZED CHAFF FIBER HAVING AN EVANESCENT RADAR REFLECTANCE CHARACTERISTIC, AND METHOD OF MAKING THE SAME," abandoned in favor of continuation-in-part U.S. application Ser. No. 07/982,393 filed Nov. 27, 1992, now allowed; and U.S. application Ser. No. 07/449,695 filed Dec. 11, 1989 in the names of Ward C. Stevens, Edward A. Sturm, and Bruce C. Roman, for "CHAFF FIBER COMPRISING INSULATIVE COATING THEREON, AND HAVING AN EVANESCENT RADAR REFLECTANCE CHARACTERISTIC, AND METHOD OF MAKING THE SAME," now U.S. Pat. No. 5,087,515.

FIELD OF THE INVENTION

This invention relates to chaff with transient radar absorbance and/or reflectance characteristics, having utility as an electronic warfare countermeasure useful in an absorbance mode for at least partial attenuation of radar signals, and useful in a reflectance mode as an electromagnetic detection decoy or for anti-detection masking of an offensive attack.

DESCRIPTION OF THE RELATED ART

In modern warfare, a wide variety of weapons systems are employed which operate across the electromagnetic spectrum, including radio waves, microwaves, infrared signals, ultraviolet signals, x-rays and gamma rays.

To counter such weapons systems, smoke and other obscurants have been deployed. In the past, smoke has been variously employed as a means of protection of ground-based military vehicles and personnel during conflict, to blind enemy forces, to camouflage friendly forces, and to serve as decoys to divert hostile forces away from the positions of friendly forces. With the evolution of radar guided missiles and increasing use of radar systems for battlefield surveillance and target acquisition, the obscurant medium must provide signal response in the millimeter wavelengths of the electromagnetic spectrum.

The use of "chaff", viz., strips, fibers, particles, and other discontinuous-form, metal-containing media to provide a signal response to radar, began during World War II. The first use of chaff involved metal strips about 300 millimeters long and 15 millimeters wide, which were deployed in units of about 1,000 strips. These chaff units were manually dispersed into the air from flying aircraft, to form chaff "clouds" which functioned as decoys against radars operating in the frequency range of 490–570 Megahertz.

Chaff in the form of aluminum foil strips has been widely used since World War II. More recent developments in chaff technology include the use of aluminum-coated glass filament and silver-coated nylon filament.

In use, chaff elements are formed with dimensional characteristics creating dipoles of roughly one-half the wavelength of the hostile electromagnetic system. The chaff is dispersed into a hostile radar target zone, so that the hostile radar "locks onto" the signature of the chaff dispersion. The chaff is suitably dispersed into the air from airborne aircraft, rockets or warheads, or from ground-based deployment systems.

The chaff materials which have been developed to date function effectively when deployed at moderate to high altitudes, but are generally unsatisfactory as obscuration media in proximity to the ground due to their high settling rates. Filament-type chaff composed of metal-coated fibers may theoretically be fashioned with properties superior to metal strip chaff materials, but historically the "hang time" (time aloft before final settling of the chaff to the ground) is unfortunately still too short to accommodate low altitude use of such chaff. This high settling rate is a result of large substrate diameters necessary for standard processes, typically on the order of 25 microns, as well as thick metal coatings which increase overall density. A further problem with metallized filaments is that typical metal coatings, such as aluminum, remain present and pose a continuing electrical hazard to electrical and electronic systems after the useful life of the chaff is over.

Although chaff has been highly successfully employed by the prior art, and is routinely used to decoy or divert radar guided threats away from military aircraft, successful exploitation of chaff typically requires precise synchronization of the chaff dissemination with an evasive maneuver. Thus, training is critical to the effective use of chaff for enhanced survivability against radar-based threats. Though the need for realistic training is universally accepted, environmental concerns over the effects of chaff pose a serious and growing threat to peacetime training in its use.

Considering the environmental impact of chaff material usage, in warfare as well as peacetime training applications, it is recognized that conventional chaff materials can measurably affect the electromagnetic environment long after their defense utility has passed. It also is recognized that long-term physical health risks may result from the persistence of the glass fibers which serve as the substrate for standard aluminized chaff materials.

In this respect, the persistence of aluminized glass fibers after settling to the ground and the perception of respiratory or digestive hazards of these materials has limited the open air dissemination of chaff for testing and training. Ranchers and environmentalists, particularly in the midwestern U.S., have objected to chaff because it is carried uncontrollably by the wind and settles on populated areas or on land grazed by wildlife and livestock. Additionally, the United States FAA has experienced difficulties in monitoring air traffic because of the electromagnetic noise associated with drifting chaff.

It would therefore be a substantial advance in the art to provide a chaff material which variously is characterized by a reduced settling rate and increased hang time, as compared with conventional chaff materials, overcomes the persistence of adverse electrical characteristics which is a major disadvantage of conventional chaff materials, and is of enhanced environmentally acceptability in relation to conventional chaff materials.

Further, developments in radar and weapons technologies have resulted in the growing emergence of millimeter wave electromagnetic radiation for detection purposes. The so-called K band radiation generally employed is characterized by electromagnetic spectrum frequencies on the order of 35 GigaHertz and higher, and has been the focus of efforts to provide effective absorption and reflectance countermeasures. This effort has been unsuccessful to date. Break-lock chaff, for example, contains no components which are effective against the K band radiation.

Accordingly, it is an object of the present invention to provide an improved chaff material which overcomes the difficulties and deficiencies of the prior art.

It is another object of the present invention to provide a chaff material having a metal component with an evanescent electromagnetic detection signature.

It is another object of the present invention to provide a chaff material whose electronic signature may be selectively adjusted so that the chaff material is transiently active for a predetermined time, consistent with its purpose and its locus of use.

It is a further object of the invention to provide a chaff material which is environmentally degradeable to relatively benign end products.

It is yet another object of the invention to provide a chaff material which is effective against millimeter wave electromagnetic radiation.

Other objects and advantages of the present invention will be more fully apparent from the ensuing disclosure and appended claims.

SUMMARY OF THE INVENTION

The present invention broadly relates to an article comprising a non-conductive substrate having a thickness of an oxidizable metal coating thereon, wherein the oxidizable metal coating is rapidly oxidized in use to an oxidized state.

Examples of such article include chaff articles having an evanescent radar reflectance and/or absorbance character in environmental exposure including at least 5% relative humidity conditions.

The article of the present invention may suitably comprise an oxidation enhancingly effective amount of salt on the oxidizable metal coating.

The salt may for example, comprise from about 0.005 to about 25% by weight, based on the weight of oxidizable metal, of a metal salt or organic salt on the oxidizable metal coating, the specific amount employed being enhancingly effective for oxidation of the oxidizable metal coating. The oxidizable metal may suitably be any metal species or combination of metal species which is compatible with the substrate and salt material, and appropriate to the end use application of the coated product article. Suitable metals may, for example be selected from the group consisting of iron, aluminum, copper, zinc, tin, nickel and combinations thereof.

In chaff applications, the oxidizable metal preferably is iron, aluminum, or aluminum-coated iron.

The non-conductive substrate may be formed of any of a wide variety of materials, including glasses, polymers, preoxidized carbon, non-conductive carbon, nylon, rayon, polyester, polyetherimide, polyethylene, polyphenylenesulfide, polyetherketone, polylactic acid, acetate, starch doped polyethylene, modified polybutylene terephthalate, hydrolyzable nylon, chitosan, chitosan acetate, polyglycolic acid, polycaprolactone, sugar, polyvinyl alcohol, cotton, wool, silk, hemp, flax, hair, mohair, ramie, cellulosics, polyacrylonitrile, and ceramics, with glasses, particularly oxide glasses and specifically silicate glasses, generally being preferred. For chaff applications, the substrate preferably is in the form of a filament, which may for example, be on the order of 0.5 to about 25 microns in diameter, and preferably from about 2 to about 15 microns in diameter. The substrate may for example comprise an environmentally degradeable material, such as water soluble and biodegradable polyvinyl alcohol, doped nylon, or chitosan, whereby the substrate is dissipated in the environment after the article has been used and the oxidizable metal coating has been oxidized.

The salt provided on the oxidizable metal coating may be constituted by any of various suitable salts, including metal halide, metal sulfate, metal nitrate, and organic salts. Preferably, the salt is a metal halide salt, whose halide constituent is chlorine, e.g., sodium chloride or lithium chloride.

In chaff applications, wherein the chaff article desirably includes a filamentous or other small-diameter substrate element, the salt-doped oxidizable metal coating is characterized by a radar signature which in the presence of moisture, e.g., atmospheric humidity, decays as a result of progressive oxidation of the oxidizable metal coating, with the rate of such oxidation being accelerated by the salt constituent present on the oxidizable metal coating.

The metal-coated substrate articles of the invention when employed for chaff applications, include metal-coated fiber articles as well as metal-coated substrates of non-fibrous conformations, and include chaff articles having utility in the radio frequency regime of the electromagnetic spectrum (electromagnetic radiation frequencies of up to 9 GigaHertz) as well as chaff articles having utility in the millimeter wave range of the electromagnetic spectrum (e.g., in the vicinity of 35 GigaHertz, and higher frequencies).

In one aspect, the invention relates to a millimeter wave radiation chaff article comprising a fiber substrate having a diameter in the range of from 2 to 15 micrometers, and a length on the order of the half-wavelength of the millimeter wave radiation against which the chaff is effective, to provide an effective dipole for radiation absorbance and/or reflectance. Such fiber substrate is coated with a coating of a metal such as aluminum, with the metal coating being doped with a suitable salt rendering the metal coating oxidatively evanescent in exposure to atmospheric moisture conditions, so that a transient millimeter wave radiation absorbance or reflectance is achieved.

In another aspect, the invention relates to a chaff dissemination assembly for disseminating to a selected chaff exposure locus a quantity of millimeter wave radiation chaff articles of the above-described type, optionally in combination with a quantity of a radio frequency radiation chaff articles. The chaff dissemination assembly may comprise a housing or container holding the chaff articles, and adapted to be utilized with an ejector mechanism whereby the chaff articles are introduced in finely dispersed form to the chaff exposure locus. Such an article may for example comprise I band and K band radar chaff articles. Alternatively, the chaff dissemination assembly may comprise a cutter apparatus for cutting chaff precursor articles in the theatre of use, and contemporaneously distributing the resultingly cut chaff articles to the chaff exposure locus.

In a broad method aspect, the present invention relates to a method of forming an evanescently conductive coating on a non-conductive substrate, comprising:

(a) depositing on the substrate a thickness of oxidizable metal, to form an oxidizable metal-coated substrate, wherein the oxidizable metal preferably is selected from the group consisting of iron, aluminum, nickel, copper, zinc, tin, and combinations (alloys, eutectics, internetallic composites, etc.) thereof; and (b) providing on the oxidizable metal-coated substrate a salt which is enhancingly effective for the oxidation of the oxidizable metal deposited on the substrate, wherein the salt preferably is present at a concentration of from about 0.005% to about 25%, more preferably from about 0.1% to about 20%, and most preferably from about 0.5% to about 15% by weight of salt, based on the weight of oxidizable metal in the oxidizable metal coating on the substrate and as dictated by the desired corrosion rate.

In another aspect, the present invention relates to an article comprising a non-conductive substrate having coated thereon a thickness, e.g., in the range of from about 0.001 to about 10 microns, of an oxidizable metal coating with an exterior surface, and from about 0.005% to about 25% by weight, based on the weight of oxidizable metal in the oxidizable metal coating, of a salt which is effective to accelerate the rate of oxidation of oxidizable metal in the oxidizable metal coating under oxidation conditions therefor, the salt being present on the exterior surface of oxidizable metal coating.

Such substrate may for example comprise an environmentally degradeable material as hereinafter more fully described.

In a particular embodiment, the oxidizable metal coating may advantageously comprise an underlying iron coating and an overlying aluminum coating. Alternatively, an aluminum metal coating may be employed.

In a further aspect, the present invention relaties to an article comprising an environmentally degradeable substrate having coated thereon a thickness of an oxidizable metal coating which is susceptible to oxidation under atmospheric exposure including at least 5% relative humidity, and wherein the 10 minute change in resistance of the oxidizable metal coating at 50% relative humidity is at least 100.

Such oxidizable metal coating in one specific aspect comprises an exterior surface having present thereon from about 0.005% to about 25% by weight, based on the weight of oxidizable metal in the oxidizable metal coating, of a salt which is effective to accelerate the rate of oxidation of oxidizable metal in the oxidizable metal coating under atmospheric exposure oxidation conditions therefor.

In another aspect, the present invention relates to a method of establishing an evanescent radar response characteristic (e.g., reflectance or absorption of radar) at a selected location, comprising deploying a salt-doped, metal-coated chaff material at such location, such as a chaff comprising a salt-doped, aluminum-coated chaff article.

In yet another aspect, the present invention relates to a method of enhancing radar absorption of a chaff material in exposure to radar, comprising utilizing as such chaff an aluminized glass chaff material.

As used herein, the term "environmentally degradeable" is intended to mean the compositional and/or structural breakdown of a material in the environment (for example, out of doors in the exterior or natural surroundings), under biological, chemical and/or electromagnetic attack, resulting in the loss of the compositional and/or structural integrity of the original material.

Other aspects and features of the invention will be more fully apparent from the ensuing disclosure and appended claims.

BRIEF DESCRIPTION OF THE DRAWINGS

FIG. 19 is a plot of backscattered reflectivity cross section, in square meters, as a function of time in microseconds, for the chaff clouds of FIG. 18, showing the dissipation of the radar reflectivity of the salt-doped aluminum-coated glass fibers.

DETAILED DESCRIPTION OF THE INVENTION, AND PREFERRED EMBODIMENTS THEREOF

Figure 1:
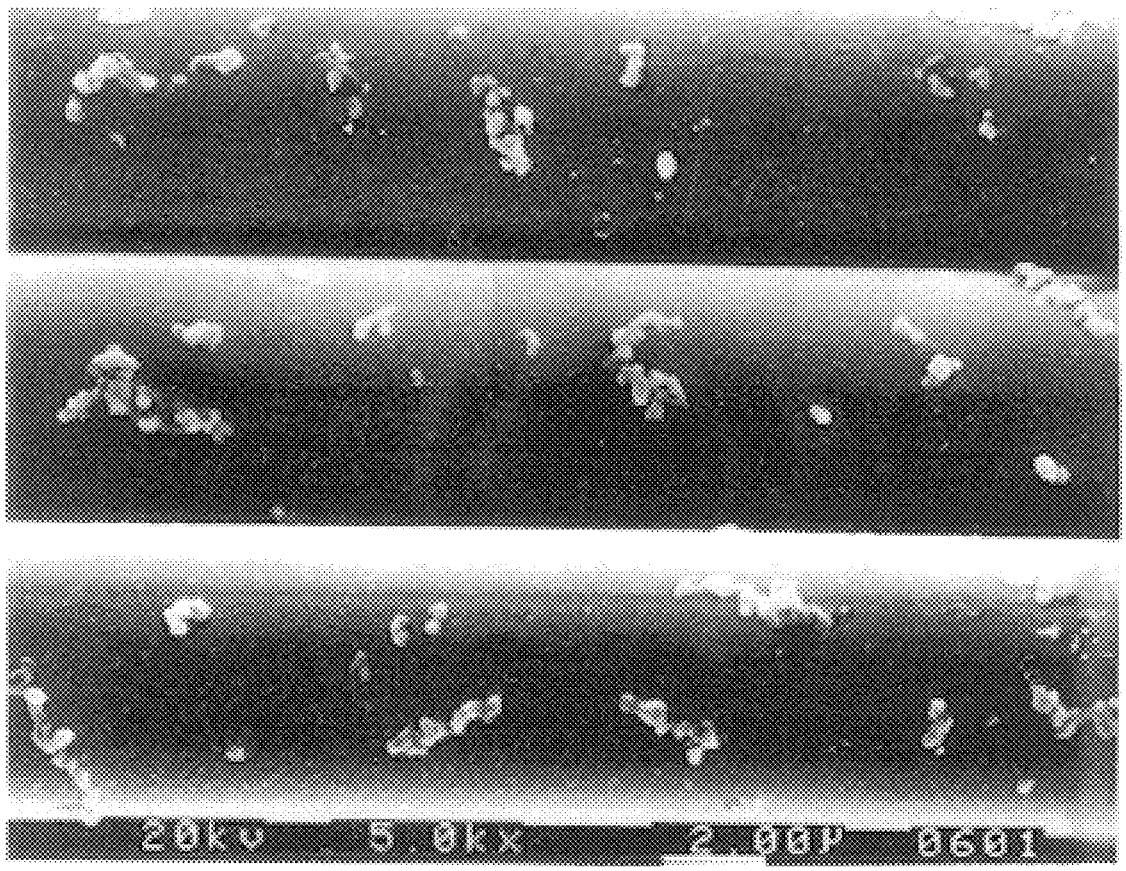
FIG. 1 is an electron photomicrograph, at magnification of 5,000 times, of salt-doped, iron-coated glass filaments according to one embodiment of the present invention, with iron (III) chloride as the deposited salt species.

The present invention relates broadly to an article comprising a non-conductive substrate, preferably an environmentally degradeable substrate, having a thickness of an oxidizable metal coating thereon.

The metal-coated substrate article may optionally comprise an oxidation enhancingly effective amount, e.g., from about 0.005% to about 25% by weight, based on the weight of oxidizable metal in the oxidizable metal coating, of a salt (e.g., a metal salt or an organic salt) on the oxidizable metal coating. Preferably, the oxidizable metal is selected from the group consisting of iron, aluminum, copper, zinc, tin, nickel, and combinations thereof.

Although discussed primarily in the ensuing discussion in terms of chaff article applications, wherein the substrate element preferably is a small-diameter filament, the utility of the present invention is not thus limited, but rather extends to any other applications in which a temporary conductive coating is desired on a substrate.

Examples of other illustrative applications include moisture sensors, corrosivity monitors, moisture barrier devices, and the like. Specifically, the applications outside of usage in warfare applications incudes the usage of the coated fiber technology of the invention for the development and commercialization of next-generation batteries for vehicles and equipment. As another example, the automotive industry would utilize conductive fibers made in accordance with the present invention to provide conductivity to a plastic auto body for the purpose of electrostatic spray painting. Conductive fibers according to the invention may also be employed in other composite applications (brake pads, lightning strike protection, EMI shielding housings, satellite dishes, etc.) where the degradability of fibers released in the destruction of such parts can eliminate potential health or electrical risks. Additionally, the use of metalized fibers for marking of ships in distress, downed aircraft, lost hikers, etc., offers a potential means of location by aircraft or satellite for expedited rescue. In these applications, the degradability of the fibers after their useful lifetime is critical for their use.

Accordingly, the substrate may have any composition and may take any form which is suitable to the manufacturing conditions and end use environment of the product article.

For chaff applications, it is preferred that the substrate be in filamentous (i.e., fiber) form, however, other substrate forms, such as microbeads, microballons, hollow fibers, powders, flakes, ribbons, and the like may be employed.

For applications other than chaff, it may be necessary or desirable to provide the substrate element in bulk physical form, or alternatively in a finely divided, filamentous, or particulate form, of the types illustratively described above in connection with chaff articles according to the invention.

Irrespective of its physical form, the substrate element is non-conductive in character, and may be formed of any material which is appropriate to the processing conditions and end use applications of the product article. Illustrative substrate element materials of construction include glass, polymeric, ceramic, pre-oxidized carbon, and non-conductive carbon materials, nylon, rayon, polyester, polyetherimide, polyethylene, polyphenylenesulfide, polyetherketone, polylactic acid, acetate, starch doped polyethylene, modified polybutylene terephthalate, hydrolyzable nylon, chitosan, chitosan acetate, polyglycolic acid, polycaprolactone, sugar, and polyvinyl alcohol. Particularly preterred environmentally degradeable substrate materials of construction include water soluble and biodegradable polyvinyl alcohol (PVA), as well as doped nylon and chitosan.

By "pre-oxidized carbon" is meant polyacrylonitrile fibers which have been heat stabilized.

Oxide materials such as boria ($B_2O_3$) may be usefully employed in some applications. For chaff usage, boria has the advantage of being water soluble, whereby it can be dissipated by moisture.

Illustrative examples of potentially useful polymeric materials of construction for substrate elements include cotton, wool, silk, hemp, flax, hair, mohair, ramie, cellulosics, polyethylene, polyester, polyacrylonitrile, and polymeric fibers commercially available under the trademarks Tencel®, Mater-Bi®, Novon®, Biopol®, Cellulon®, Kevlar® and Kynol®.

In chaff applications, the density of the substrate element material of construction preferably is less than 2.9 grams per cubic centimeter, and most preferably is on the order of from about 1.3 to about 2.9 grams per cubic centimeter.

Illustrative glass materials of construction for chaff articles of the present invention include oxide glasses, and more specifically silicate glasses. Silicate glasses have been advantageously employed in filamentous substrate elements in the practice of the present invention, and sodium borosilicate, calcium silicate, sodium silicate, aluminosilicate, and aluminoborosilicate glasses may also be used to advantage. In general, the glasses useful for substrate elements in chaff applications have a density on the order of from about 2.3 to about 2.7 grams per cubic centimeter.

In one aspect of the present invention, the substrate is formed of an environmentally degradeable material, such that after usage of the article in its intended application, the article is dissipated or otherwise degraded in the environment of use, e.g., the substrate is degraded biologically, and/or dissolved by virtue of a high water solubility of the substrate material, and the metal coating is fully oxidized to an oxide or other reacted form of enhanced environmental compatibility.

Set out below is a discussion of various specific materials of construction which may be variously usefully employed in the broad practice of the present invention.

Various primary types of materials which may be usefully employed as substrate materials of construction in the broad practice of the present invention include naturally occurring fibers, naturally derived polymers, water soluble materials, bio-absorbable materials, doped polymers, spinable edibles, and environmentally benign polymers. Individual materials within these classes may be selected for specific applications based on their properties and specific concerns such as compatibility, degradability, toxicity, thermal stability, cost, availability, and stiffness.

Naturally occurring fibers as a class of materials are considered attractive since these fibers are found in nature and most are relatively inexpensive. Included in naturally occurring fibers are cotton, wool, silk, hemp, hair, flax, mohair, ramie, and unrefined cellulosics.

Approximately 94% cellulose, cotton is a product of the textile industry known for its relative strength and stability. Its price and availability are extremely favorable, with the exception that it is a staple fiber (not available in continuous lengths). Naturally biodegradable, cotton can be attacked by mildew, bacteria, silverfish, termites, yeast and crickets. The elastic modulus of cotton can range from 42–82 g/den. Its decomposition temperature, 150° C., is above that seen during the coating process, making it an acceptable metalization candidate.

Wool belongs to the keratin protein family. Wool naturally grows with crimps in it, causing it to be quite elastic. Amino acids which make up this material have reactive side groups which allow the material to be chemically modified, altering the properties. In addition, sulfur linkages in the chemical structure make it susceptible to UV degradation, even while the material is on the animal's back. To keep the animal dry, this material is able to absorb as much as 18% water. As with other naturally occurring materials, wool is also completely biodegradable, (or more appropriately, digestible; moths and beetles feed on it). The cost is low and the material is abundant although, again, this is a staple fiber. Wool and cotton can be spun to yield pseudo continuous yarns, but chopping of spun yarns at desired dipole intervals yields a wide range of filament lengths.

Silk is also a natural protein. The majority of commercial silk is obtained from the cocoons of silkworm caterpillars, although in a few select applications, silk from spider webs is used. Silk is a hygroscopic material that is quite flame resistant. It is tougher than cotton, and has a strength similar to that of nylon or pure iron of equivalent weight. Like wool, silk is very elastic. Though not as sensitive to mildew and mold as the other materials in this category, silk is very UV sensitive, being adversely affected after only a few months of exposure.

The second type of substrates, naturally derived polymers, includes materials that are produced either chemically or biologically from naturally occurring polymers like cellulose, starch, and proteins.

Rayon, also called regenerated cellulose, is produced using either cotton linters (short cotton fibers) or wood pulp, both of which are virtually pure cellulose. Rayon differs from its starting material only in degree of polymerization. Some forms, however, will have up to fifteen percent of the hydrogen in the hydroxyl groups substituted with something else. This fiber has tensile strengths in approximately the same range as nylon and a decomposition temperature of 180° C. Rayon, is considered to be naturally biodegradable (attacked by mildew and weathers over long exposure to sunlight and air), but creates a sulfuric acid by-product when it decays. It is nonetheless widely availability in fiber form and is relatively cheap. Used in the textile industry, rayon is produced in a variety of tow and filament sizes by a number of companies. Viscose rayon is a product form which finds application in the medical industry and exhibits high water sorption and hot water solubility. A particularly preferred cellulosic material useful for manufacture of substrates in the broad practice of the present invention is available under the trademark Tencel® (Courtaulds Fibers, Inc., Mobile, Ala.) which is a lyocell or solvent spun cellulosic fiber which is degradeable by mildew.

A second candidate substrate material chemically derived from cellulose is cellulose acetate, often simply referred to as acetate. This natural polymer derivative is a thermoplastic resin which is as abundant as rayon and economical. Cellulose acetate can have a flexural strength ranging from 20 to 160 Ksi and will absorb up to 6.5% water. Both of these qualities are inferior to those of the rayon, but acetate is more degradable in that it is susceptible to UV radiation.

Pre-ox, or pre-oxidized carbon, fibers are the precursor to the high strength carbon and graphite fibers used in advanced composites. These fibers are oxidized and partially carbonized rayon, acrylic (polyacrylonitrile, PAN) or pitch tar. Rayon, or cellulose acetate, can be thermo-oxidatively treated to drive of water and volatile non-carbon ingredients. In the manufacture of high strength and high modulus carbon fibers, the fiber is stretched and heated to high temperatures in inert gas to align the carbon planes imparting strength, stiffness, electrical conductivity, and chemical/environmental stability to the fiber. Intermediate treatment can remove the non-carbon ingredients and improve thermal stability for the metalization process without adding conductivity and totally eliminating degradability. Pre-ox fibers are available in quantity as staple, yarn, or continuous fiber tows. Their strength and stiffness are between that of the precursor and the carbon fiber, and may be controlled by the heat treatment conditions.

A biologically produced, naturally derived polymer substrate material candidate is Mater-Bi®, a thermoplastic material primarily derived from corn starch and vegetable oil. As a biodegradable alternative to conventional polymers such as polyethylene and polystyrene, it will degrade in both aerobic and anaerobic conditions, producing water and carbon dioxide or methane. The material sinks in sea water and can be eaten by aquatic organisms. This material swells in contact with water. Under aerobic conditions a 91% weight loss is seen for Mater-Bi® in ten months. In soil burial tests, greater than a 55% loss of weight is observed in 49 days. Mater-Bi® decomposes at 200° C.

A second naturally derived polymer, Novon® (Warner Lambert Co., Morris Plains, N.J.), is also starch based (potatoes and corn starch), but has other polymers included (PCL, PVA, PLA, or cellulose acetate). Novon® is completely biodegradable in composting or sewage treatment environments.

Biopol® (Zeneca Bio-Products, Wilmington, Del.) is another candidate substrate material, and comprises a thermoplastic polyester derived from organic feed stock. The bulk of the resin is poly(hydroxybuterate), (PHB), with varying amounts of poly(hydroxyvalerate), (PHV), added to impart specific characteristics to the different grades of this copolymer. The lower the valerate content, the stiffer the material. The flexural modulus varies from 116 to 392 Ksi depending on the grade or valerate content. Similarly, melt temperature can be adjusted between 136 and 162° C. Degradability is excellent, with the same by-products as the other starch-based materials (carbon dioxide and water or methane). It will degrade in both aerobic and anaerobic environments and has been tested by a number of institutions.

Another substrate candidate among the naturally derived polymers is a bacteria-produced cellulose, of the trade name Cellulon® (Weyerhaeuser Co., Tacoma, Wash.). This material is a form of cellulose, and is readily biodegradable, being easily broken down into glucose by herbivores.

Another class of substrate material candidates comprises materials which can be fully dissolved or solubilized in water. Their water solubility is consistent with a high sensitivity to atmospheric moisture. Dew or even humid air can swell these materials causing disruption of the thin metal coating.

One soluble polymer suitable for use as a substrate material is polyvinyl alcohol, or PVA. PVA is readily available in fiber form in many diameters and tow configurations with different solubility characteristics. PVA completely dissolves in water as quickly as a few seconds, or can take much longer, depending on PVA grade, water temperature, fiber size and solubility limits. The fiber swells and deforms when exposed directly to water, and (for a metalized fiber product) these intense physical changes during degradation can rapidly fragment or disrupt the conductive coating rendering it non-resonant at RF frequencies.

One variety of PVA (commercially available from Kuraray International Corp.) is vinylon fiber, which shows a high degree of shrinkage (up to 40%) in water and is soluble in hot water. Like swelling, this shrinkage may be employed to destroy the integrity of the metal coating upon exposure to water.

Another soluble polymer which may be usefully employed in the formation of substrate elements is chitosan acetate. Chitosan acetate and chitosan formate-acetate are intermediates in the process of making chitosan (or chitosane) films from chitin which is extracted from the shells of crustaceans. These intermediates are readily formable and spinnable into fibers.

When immersed in water, chitosan acetate becomes gel-like but does not completely dissolve. However, all strength and stability is lost and in metal-coated article applications, this loss of structure may be utilized to disrupt the metal coating and cause it to break apart.

Another substrate candidate material is soluble glass. In the production of many silicate glasses, some amount of boria (boron oxide) is added to enhance processability. Boria has a lower melt flow temperature and lower viscosity than silica and is easier to spin, extrude, or otherwise process. Considered an unfavorable property for most glass applications, boria has an extremely high moisture sensitivity and is typically used in low concentrations. Boria is hydroscopic and in high purity it very rapidly absorbs moisture from the air causing a steady degradation of physical integrity. The stability of boria fibers can be tailored between that of E-glass and the straight boria glass by combining silica and/or alumina with the boria in controlled amounts. A borosilicate or boro-aluminasilicate fiber would have moisture sensitivity and could be degraded to yield an alumina or silica powder. The coating with metal can slow the rapid moisture uptake to a slight degree, but compositions employing some amount of alumina and/or silica may be advantageous in the use of these materials for substrate formation.

Bio-absorbable materials are generally solubilized, absorbed, digested, or otherwise broken down by fluids in the human body. Poly(lactic acid), poly(glycolic acid), and poly(caprolactone) and copolymers of these are some of the more common absorbable polymers.

Absorbable glass properties can be adjusted between some low strength and stiffness level and that of the commercial E-glass materials.

Poly(lactic acid), or PLA, is a non-toxic polymer derived from casein or milk proteins and often used in conjunction with poly(glycolic acid) to make degradable sutures that erode within the body in a period of days. Pure polylactide is a very moisture sensitive thermoplastic.

Poly(glycolic acid), or PGA, is another substrate candidate material and is among the most widely used absorbable polymers. Polyglycolides have excellent physical and thermal properties. PGA is a crystalline polymer which gives very good stiffness even in high aspect ratio geometries. PGA polymer materials include a so-called "fiber grade" version which is a homogeneous low molecular weight polymer which has been degassed and cleaned of impurities. Vicryl® copolymer with PGA and PLA is a potentially useful substrate material (commerically available from Epicon (Sommerset, N.J.)).

Another potentially useful substrate material in this group is poly(caprolactone), or PCL, which is fully biodegradable. This copolymer is a particularly useful material when copolymerized with other thermoplastics such as polylactides and/or polyglycolides, nylon, etc. PCL can lend degradability to conventional thermoplastics via copolymerization. PCL is absorbable and can also be weathered and embrittled by extended exposure to the environment.

Although some common polymers such as nylon, polyethylene, polyester, and polystyrene have been used for several years in common household applications, their persistence in land fills has made them the focus of contention for many environmentalists. With the recent push for cleaner, greener wastes, the plastics industry has done extensive work in the study of doping these types of materials with components which make them UV degradable, moisture sensitive, or aerobically digestible.

Various conventional polymers are available in doped forms which render them biodegradable. Starch doped polyethylene is a material which can be digested by microorganisms. Other biodegradeable polymers include hydrolyzable nylon and modified poly(butylene terephthalate).

Hydrolyzable nylon has properties nearly identical to those of traditional nylon, but it degrades more readily. At elevated temperatures in sea water, the strength of the doped nylon is steadily degraded.

Poly(butylene terephthalate), or PBT, may be usefully doped for the purpose of rendering it biodegradable. It has an activation temperature of 50° C. which initiates significant decay. Below that temperature, decay still occurs, but much less rapidly.

Spinnable edibles is a group comprised of sugars, starches or complex carbohydrates, proteins, and polysaccharides. Two very interesting materials within this class are chitosan, a polysaccharide, and starch. Sugars are very readily spun into fibers and show excellent solubility and fairly good stiffness, but are extremely moisture sensitive and must be combined with other materials to establish adequate properties for processing and handling. Most of the proteins which are available or formable as fibers are not easily digested, and also must be addressed as copolymers.

Derived from crustacean shells, chitosan is a partially substituted polysaccharide which is inherently biodegradable.

Sugar is another candidate substrate material. Melt spinning of fibers from sugar is a relatively simple process. Preparing continuous length sugar fibers is only slightly more difficult than the air spinning of short fibers. Sugar has physical properties much closer to glass than do most of the amorphous polymers. Sugar can be degraded both by dissolution in water and by digestion by a multitude of organisms. Accordingly, sugar is readily degraded in a variety of environments. Additionally, sugar is very hygroscopic and draws moisture to itself even in quite dry environments.

Starch is easily spun and is fully degradable. In fiber form, its properties such as strength and stiffness are dependent on the spinning process and its molecular weight.

Environmentally benign polymers which may be usefully employed in the broad practice of the present invention include polyamide (nylon), polyester (specifically polyethylene terephthalate, PET), polyetheretherketone (PEEK), polyetherimide (PEI), polyphenylenesulfide (PPS), polytetrafluoroethylene (PTFE), and polyacrylonitrile (PAN). Of these polymers, nylon and PPS are degradable via ultraviolet exposure.

Nylon ranks high in degradability, exhibiting significant deterioration within three to six months under UV exposure.

Polyesters have some degree of degradability. Prolonged exposure to the sun is known to cause loss of strength, although the polymer is quite resistant to mildew attack and moisture.

Polyethylenes are available with a wide range of properties.

Polyetherimide (PEI) is an amorphous thermoplastic which possesses good strength and stiffness values. A particularly preferred PEI commerical material is available under the trademark Ultem® (General Electric, Fairfield, Conn.). It is easily melt spun into filaments.

Polyphenylenesulfide (PPS) is a semi-crystalline thermoplastic substrate candidate material which is compatible with the metalization (metal coating) process and is environmentally benign, although not readily degradable.

Polyetheretherketone (PEEK) is another substrate candidate material. It is a crystalline polymer whose physical properties depend strongly on the degree of its crystallization.

Physical properties of several of the above-described candidate substrate materials are shown in Table 1. Note that a range of properties is given for most of the materials. This is due to discrepancies in the literature as well as variability of the polymers, many of which are available in different grades. Corresponding values are included for glass fibers as a standard.

TABLE 1

Candidate Substrate Materials Properties

| Material | Strength in Ksi = ($10^3$ lbs/in$^2$) | Modulus in Msi = ($10^6$ lbs/in$^2$) | Max. Service Temp (° C.) |
|---|---|---|---|
| E-Glass | 350–550 | 10–10.5 | 340 |
| S-Glass | 500–700 | 12.4–13 | 370 |
| Wool | 17–29 | — | — |
| Silk | 90 | 3.2 | — |
| Cotton | 30–120 | 1.9–2.2 | 130 |
| Hemp | 100–140 | 6.4 | — |
| PEI | 15–31 | 0.44–0.48 | 170 |
| PPS | 10–86 | 0.33–0.41 | 260 |
| PEEK | 15–120 | 0.55–0.74 | 320 |
| PTFE | 29 | 0.16 | 200–275 |
| Nylon | 7–134 | 0.28–2.2 | 150–200 |
| PAN | 30–82 | 0.16–3.0 | 140–190 |
| Pre-ox | 45–525 | 3–33 | 230 |
| Rayon | 28–88 | 0.2–1.6 | 117–150 |
| Acetate | 20–32 | 0.2–1.8 | 125–190 |
| Chitosan | 40–550 | 4–35 | 140–200 |
| Polyester | 20–100 | 2.2–6.1 | 175–190 |
| PET | 16–168 | 1.9–2.9 | 225 |
| Polyethylene | 11–90 | 0.1–1.6 | 90–120 |
| Spectra ® PE | 375–430 | 17–25 | 140 |
| PBT | 7.5–8.5 | 0.33–0.36 | 180 |
| Mater Bi ® film | 4 | — | 150 |
| Biopol ® film | 2.9–4.5 | 0.11–0.39 | 110–130 |
| Novon ® | 38 | — | 50–61 |
| PVA | 42–90 | — | 230 |
| Soluble Glass | 50–450 | 4–10 | 175–275 |
| Starch | — | — | 190 |
| Sugar | — | — | 110–140 |
| PHBV | 2.9–4.5 | 0.1–0.2 | 136–162 |
| PGA/PLA | 10–100 | 2–10 | 200–240 |

Table 2 shows a more qualitative comparison of candidate substrate materials including degradability characteristics.

TABLE 2

Comparison of Substrate Condidates

| Material | Thermals | Stiffness | Toxicity | Degradability | Processing | Cost |
|---|---|---|---|---|---|---|
| Wool | ⊙ | ● | ⊙ | ● | ○ | ● |
| Cellulose | ○ | ○ | ⊙ | ○ | ● | ○ |
| Acetate | ○ | ⊙ | ○ | ⊙ | ○ | ⊙ |
| Chitosan | ⊙ | ⊙ | ● | ⊙ | ⊙ | ⊙ |
| PVA | ⊙ | ● | ○ | ● | ⊙ | ⊙ |
| Glycolides | ⊙ | ⊙ | ○ | ○ | ● | ● |
| Polyester | ⊙ | ● | ○ | ⊙ | ● | ● |
| Nylon | ⊙ | ⊙ | ○ | ⊙ | ● | ● |
| TP's | ⊙ | ○ | ○ | ● | ⊙ | ⊙ |
| Starch | ○ | ⊙ | ● | ● | ○ | ○ |

TABLE 2-continued

Comparison of Substrate Condidates

| Material | Thermals | Stiffness | Toxicity | Degradability | Processing | Cost |
|---|---|---|---|---|---|---|
| Sugar | ● | ◉ | ● | ● | ○ | ● |
| Sol. Glass | ● | ● | ○ | ● | ◉ | ○ |

Legend
● = Excellent
◉ = V. Good
○ = Average
◉ = Fair
● = Poor

Particularly preferred substrate materials include soluble or absorbable glasses, PVA, chitosan, starches and starch blends, acetate, and, depending on its processability for the given end use application, sugar.

When filamentous glass substrate elements are employed to form chaff articles in accordance with the present invention, the fiber diameter of the substrate element preferably is on the order of from about 0.5 to about 25 microns, and more preferably from about 2 to about 15 microns. If the fiber diameter is decreased substantially below about 0.5 microns, the coated chaff fibers may tend to become readily respirable, with a corresponding adverse effect on the health, safety, and welfare of persons exposed to such chaff. If, on the other hand, the diameter of the glass chaff fiber is increased substantially above 25 microns, the fiber tends to exhibit poor hang times, dropping too rapidly for effective utilization. These size constraints are dictated by the properties of the substrate material. Lower density fibers may be successfully employed at larger diameters.

Deposited on the substrate is a thickness of an oxidizable conductive metal coating, which may be formed of any suitable metal-containing composition which includes a metal which is oxidizable in character. The thickness of the metal may be sub-micron in character, or alternatively, the metal thickness may be 1.0 micron or greater in thickness. Preferably, the oxidizable metal coating is formed of a metal selected from the group consisting of iron, nickel, aluminum, copper, zinc, tin and combinations (i.e., alloys, mixtures, eutectics, etc.) of such metals with each other or with other (metallic or non-metallic) constituents.

By "sub-micron thickness" is meant that the oxidizable metal coating has an applied thickness of less than 1.0 micron. Consistent with the objective of the invention to provide a conductive coating on the substrate which is rapidly rendered non-conductive by oxidation thereof, the thickness of the oxidizable metal coating in various applications of the present invention does not exceed 1.0 mil. In such applications, it has been found that at oxidizable metal coating thicknesses above about 1.0 micron, metal coated filaments in such chaff applications tend to stick or adhere to one another, particularly when the chaff is provided in the form of multifilament tows, which typically may contain on the order of from about 200 to about 50,000 filaments per tow, and preferably from about 1,000 to about 12,000 filaments per tow. In these applications, it also has been found that at oxidizable metal coating thicknesses significantly above 1.0 micron, differential thermal effects and/or deposition stresses tend to adversely affect the adhesion of the metal film to the substrate element, with consequent increase in the tendency of the oxidizable metal film on the coated article to chip or otherwise decouple.

Nonetheless, it is to be recognized that the optimal metal coating thickness may be widely varied in the broad practice of the invention, and that in some applications, metal coating thicknesses substantially above 1.0 micron, e.g., up to about 10 microns or more in thickness, are desirably employed. The specific necessary or desired metal coating thickness in a given end use application may be readily determined within the skill of the art to achieve a selected rate and/or extent of oxidation of the metal coating in a given end use exposure or use environment.

In various chaff applications utilizing filamentous substrate elements, the oxidizable metal coating thickness may suitably be on the order of 0.002 micron to about 0.25 micron, with a thickness range of from about 0.025 micron to about 0.10 micron being generally preferred. Disproportionately lower film thicknesses of the oxidizable metal coating result in discontinuities which adversely affect the desired conductivity characteristics of the applied oxidizable metal coating. In chaff applications, the oxidizable metal preferably is iron or aluminum, although other metal species such as nickel, copper, zinc, and tin may potentially advantageously be employed, as well as combinations of such metals.

Although a wide variety of metal species and metal deposition/formation techniques may be employed in the broad practice of the invention for the metallization of the substrate, iron and aluminum are in general the preferred metal species, and chemical vapor deposition (CVD) and physical vapor deposition (PVD) are the preferred metallizing techniques.

Iron pentacarbonyl is a preferred low temperature precursor for iron CVD metallization of the substrate outer surface, via atmospheric pressure, low temperature chemical vapor deposition of iron on continuous length fiber or other substrate materials from the carbonyl precursor. Iron can also be deposited using electron beam assisted evaporative coating techniques and sputtering. These two PVD approaches do not yield a 360° circumferential coating, but electromagnetic modeling suggests that this may not be required. Iron offers the advantages of easy oxidation for elimination of conductivity and is generally considered the most environmentally prevalent and one of the least problematic of all metals with regard to disposal.

In the millimeter wave chaff regime, the chaff articles may be formed by dip processes in which the fiber substrates are dipped into molten metal to provide a so-called "half-coat" chaff. The fiber substrate in such process may be coated with the molten metal by contact of the fiber on its outer circumference with the meniscus of the molten metal, whereby a lower portion of the generally horizontally disposed fiber is coated over e.g., 40–75% of the circumference of the fiber, with the metal film.

To achieve suitable thicknesses of the oxidizable metal coating on the substrate, particularly low thicknesses of 10 microns or less, it may be preferred in practice to utilize chemical vapor deposition processes to deposit elemental oxidizable metal on the substrate from an organometal precursor material, although any other process techniques or methods which are suitable to deposit the oxidizable metal coating in the desired thickness may be usefully employed.

It will be recognized, however, that the specific substrate element material of construction must be selected to retain the substrate element's desired end-use characteristics during the coating operation, as well as during the subsequent treatment steps. Accordingly, when chemical vapor deposition is employed to deposit an oxidizable metal coating, e.g., of iron, on the substrate, temperatures in the range of 90° C.–800° C. can be involved in respective steps of the coating process. Oxidizable metal application temperatures are dictated by the thermal carrying properties and thermal stability of the substrate. Thus, these properties of the substrate can determine the properties of the deposited film. Accordingly, a substrate material accommodating a range of processing temperatures is preferred, e.g., glass or ceramic.

As an example of the utilization of chemical vapor deposition to deposit the elemental oxidizable metal coating on the substrate material, the substrate element may be a borosilicate glass fiber with a diameter on the order of 3–8 microns. Such fibers may be processed in a multizone chemical vapor deposition (CVD) system including a first stage in which the substrate filament is desized to remove epoxy or starch size coatings, at a temperature which may be on the order of 650° C.–800° C. and under an inert or oxidizing atmosphere. Following desizing, the clean filament may be conducted at a temperature of 450° C.–600° C. into a coating chamber of the CVD system. In the coating chamber, the hot filament is exposed to an organoiron precursor gas mixture, which may comprise iron pentacarbonyl as the iron precursor compound at a concentration of 5–50% by weight in a carrier gas such as hydrogen. This source gas mixture may be at a temperature on the order of 75° C.–150° C. in the coating chamber, whereby elemental iron is deposited on the substrate element from the carbonyl precursor compound. The coating operation may be carried out with repetition of the heating and coating steps in sequence, to achieve a desired film thickness of the applied iron coating.

It will be appreciated that the foregoing description of coating of the non-conductive substrate with iron is intended to be illustrative only, and that in the broad practice of the present invention, other CVD iron precursor compound gas mixtures may be employed, e.g., ferrocene in a hydrogen carrier gas. Alternatively, other non-CVD techniques may be employed for depositing the oxidizable metal on the substrate, such as solution plating.

Subsequent to application to the substrate of an oxidizable metal coating of the desired thickness, the oxidizable metal-coated substrate may optionally be provided with a suitable oxidation enhancingly effective amount, e.g., from about 0.005% to about 25% by weight, based on the weight of oxidizable metal in the oxidizable metal coating, of a salt, e.g., a metal salt or organic salt, on the external surface of the oxidizable metal coating.

The salt may comprise any suitable salt species, such as for example, metal salts (e.g., halides, nitrates, sulfates, etc.) and organic salts (e.g., citrates, stearates, acetates, etc.), the choice of a specific salt being readily determinable by simple corrosion tests without undue experimentation. It will likewise be appreciated that the type and amount, or "loading", of the salt on the oxidizable metal coating may be widely varied as necessary or desirable to correlatively provide a predetermined service life for the oxidizable metal under corrosion conditons in the specific end use environment in which the product article is to be deployed.

Since it is desired that the oxidizable metal coating be retained in an oxidizable state, the oxidizable metal-coated substrate suitably is processed in the salt application or formation ("doping"), and succeeding steps, under an inert or other non-oxidizing atmosphere.

The salt doping of the oxidizable metal-coated substrate advantageously may be carried out by passage of the oxidizable metal-coated substrate through a reaction zone in which the oxidizable metal coating is exposed to halogen gas, such as chlorine, to form a metal salt on the oxidizable metal surface, or by contacting of the oxidizable metal-coated substrate with a solution of a salt, e.g., metal salt or organic salt, or in any other suitable manner, effecting the application of the salt to the external surface of the iron coating.

Generally, however, solution bath application of the salt is preferred, and for such purpose the bath may contain a low concentration solution of salt in any suitable solvent. Preferably, the solvent is anhydrous in character, to minimize premature oxidation of the oxidizable metal coating. Alkanolic solvents are generally suitable, such as methanol, ethanol, and propanol, and such solvents are, as indicated, preferably anhydrous in character. The salt may be present in the solution at any suitable concentration, however it generally is satisfactory to utilize a maximum of about 25% by weight of the salt, based on the total weight of the salt solution.

In the preferred salt solution formation of a salt coating on the oxidizable metal surface, any suitable salt may be employed in the salt solution bath, although metal halide salts and metal sulfate salts are preferred. Among metal halide salts, the halogen constituent preferably is chlorine, although other halogen species may be utilized to advantage Examples of suitable metal halide salts include lithium chloride, sodium chloride, zinc chloride, and iron (III) chloride. A preferred metal sulfate species is copper sulfate, CuSO4. Typically from about 0.005 to about 25% by weight of salt, based on the weight of oxidizable metal, is applied to the oxidizable metal coating, with from about 0.1 to 20% by weight being preferred, and from about 0.5% to about 15% being most preferred (all percentages of salt being based on the weight of oxidizable metal in the oxidizable metal coating on the substrate element).

Among the aforementioned illustrative metal chlorides, iron (III) chloride is a preferred salt. It is highly hygroscopic in character, binding six molecules of water for each molecule of iron chloride in its most stable form. Iron (III) chloride has the further advantage that it adds Fe (III) to the metal-coated fiber to facilitate the ionization of the oxidizable metal. For example, in the case of iron as the oxidizable metal on the non-metallic substrate, the presence of Fe (III) facilitates the ionization of Fe (0) to Fe (II). Additionally, iron (III) chloride is non-toxic in character. Copper sulfate is also a preferred salt dopant material since the copper cation functions to galvanically facilitate the ionization of iron, enhancing the rate of dissolution of the iron film, when iron, the preferred oxidizable metal, is employed in the metal coating on the non-metallic substrate.

When the salt dopant is applied from a solution bath, or otherwise from a salt solution, the coated substrate after salt solution coating is dried, such as by passage through a drying oven, to remove solvent from the applied salt solution coating, and yield a dried salt coating on the exterior surface of the oxidizable metal film. The temperature and drying time employed in the solvent removal operation may be readily determined by those skilled in the art without undue experimentation, as appropriate to yield a dry salt coating on the oxidizable metal-coated substrate article. When alkanolic solvents are employed, the drying temperature generally may be on the order of 100° C.

After salt coating of the oxidizable metal-coated substrate, and drying to effect solvent removal from the applied salt coating when the salt is applied from a solvent solution, the resulting salt-doped oxidizable metal-coated substrate product article is packaged for subsequent use.

As indicated, during the processing of the substrate subsequent to application of the oxidizable metal coating thereon, the resulting oxidizable metal-coated substrate preferably is processed under an inert or otherwise non-oxidizing atmosphere, to preserve the oxidizable character of the oxidizable metal film. Thus, the salt coating, drying, and packaging steps may be carried out under a non-oxidizing atmosphere such as nitrogen. In the final packaging step, the salt-doped, oxidizable metal-coated substrate may be disposed in a package, chamber, housing, or other end use containment means, for storage pending use thereof, with a non-oxidizing environment being provided in such containment means. Thus, the final product article may be stored in the containment means under nitrogen, hydrogen or other non-oxidizing atmosphere, or in a vacuum, or otherwise in an environment substantially devoid of oxygen or other oxidizing species or constituents which may degrade the oxidizable metal coating or otherwise adversely affect its utility for its intended end use.

Depending on the type and character of the substrate element, it may be desirable to treat the substrate article in order to enhance the adhesion thereto of the oxidizable metal coating. For example, as described above regarding the usage of glass filament as the substrate element, it may be necessary or desirable to desize the glass filament when same is initially provided with a size or other protective coating, such as an epoxy, silane, or amine size coating, by heat treatment of the filament. More generally, it may be desirable to chemically or thermally etch the substrate surface, such as by acid exposure or flame spray treatment. It may also be desirable to employ a primer or adhesion promoter coating or other interlayer on the substrate to facilitate or enhance the adhesion of the oxidizable metal coating to the substrate. Specifically, it may be desirable in some instances, particularly when the substrate element is formed of materials such as glasses, ceramics, or hydroxy-functionalized materials, to form an interlayer on the substrate surface comprising a material such as polysilicate, titania, and/or alumina, using a sol gel application technique, as is disclosed and claimed in U.S. Pat. No. 4,738,896 issued Apr. 19, 1988 to W. C. Stevens for "SOL GEL FORMATION OF POLYSILICATE, TITANIA, AND ALUMINA INTERLAYERS FOR ENHANCED ADHESION OF METAL FILMS ON SUBSTRATES." The disclosure of this patent hereby is incorporated herein by reference.

Further, the metal coated substrate articles of the present invention may variously be modified in accordance with teachings of any of: U.S. Pat. No. 5,039,990 ("GALVANICALLY DISSIPATABLE EVANESCENT CHAFF FIBERS, AND METHOD OF MAKING THE SAME"); U.S. application Ser. No. 07/982,393 filed Nov. 27, 1992 ("SULFURIZED CHAFF FIBER HAVING AN EVANESCENT RADAR REFLECTANCE CHARACTERISTIC, AND METHOD OF MAKING THE SAME"); and U.S. Pat. No. 5,087,515 ("CHAFF FIBER COMPRISING INSULATIVE COATING THEREON, AND HAVING AN EVANESCENT RADAR REFLECTANCE CHARACTERISTIC, AND METHOD OF MAKING THE SAME"), the disclosures of which hereby are incorporated herein by reference.

In chaff applications of the metal-coated articles of the present invention, the transitory radar reflectance/absorbance and electrical conductivity provides the very substantial advantage that after usage of such chaff, friendly communications are not disrupted, and the potential for electrical or electronic hazards is at least minimized, after passage of the threat meriting the use of the chaff.

Referring now to the drawings, FIG. 1 shows an array of salt-doped, iron-coated glass filaments from a tow of such filaments. Each of these coated filaments comprises a glass fiber core having on an exterior surface thereof a sub-micron iron coating. On the exterior surface of the respective iron coatings of these filaments is a salt coating comprising localized salt crystalline formations. Although the localized salt deposits or polycrystalline formations are present as gross deposits of crystalline salt, it is to be recognized that microcrystals of salt also are present on the exterior surface of the iron coating, intermediate such gross crystal formations. This distribution of gross crystallite formations and scattered microcrystals on the intermediate surface areas is produced by the solution bath application method for applying salt as illustratively described hereinabove.

It is to be recognized, however, that other methods of salt coating may be employed in the broad practice of the present invention, which will result in different distributions or morphologies of salt being formed on the surface. In this respect, it is to be appreciated that the salt may be present on the exterior surface of the iron, or other oxidizable metal, coating solely in the form of scattered crystallite formations, or as a more continuous distribution on the surface of microcrystals, or a combination of such salt formations, as shown in FIG. 1, or in still other distributions or morphologies.

The photomicrograph of FIG. 1 shows the salt-doped, iron-coated glass filament at a magnification of 5,000 times. This electron micrograph was taken at a voltage of 20 kv, and the scale of the photograph is shown by the line in the right central portion at the bottom of the photograph, representing a distance of two microns.

The glass filaments employed in the coated fibers shown in FIG. 1 were of lime aluminoborosilicate composition, commercially available as E-glass (Owens-Corning D filament) 54% $SiO_2$; 14.0% $Al_2O_3$; 10.0% $B_2O_3$; 4.5% MgO; and 17.5% CaO) having a measured diameter of 4.8 microns, and were coated with an iron coating of 0.075 micron thickness. The salt coating was formed of iron (III) chloride, and was present on the iron coating in an amount of from about 1 to about 5% by weight of salt, based on the weight of iron present in the iron coating.

Figure 2:
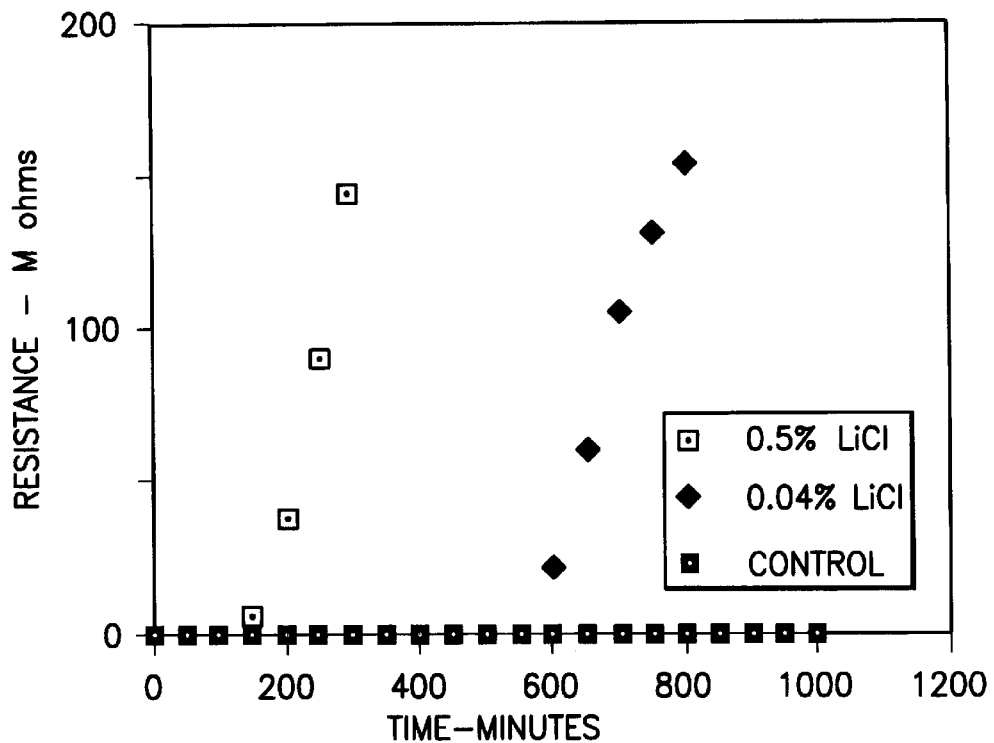
FIG. 2 is a graph of tow resistance, in Megaohms, as a function of exposure time, for a tow of iron-coated glass fibers devoid of any salt coating, and for corresponding tows with 0.04% and 0.5% by weight lithium chloride deposited thereon, respectively, in a 56% relative humidity environment.

FIG. 2 is a graph of resistance, in Megaohms, as a function of exposure time, in minutes, for fiber tows of the type shown in FIG. 1, but which were salt doped, in a first sample, with lithium chloride salt coatings formed by coating the iron film with a 0.04% lithium chloride by weight solvent solution, and in a second sample, with 0.5% lithium chloride solvent solution. A control tow of fibers was utilized as a basis for comparison, in which the fibers included an iron coating of the same thickness as the two salt-doped fiber tows, but did not include any salt coating.

In order to measure the tow resistance of the respective fiber tows, each tow was mounted on a copper contact circuit board with a known spacing, in either a two-point or four-point arrangement. Electrical contact was assured through use of conductive silver paint. Fiber tows were analyzed by use of digital multimeter. A known voltage was applied across the fiber circuit. The resulting current was metered and the resistance computed. This measurement was repeated periodically over the fiber lifetime of interest, with voltage applied, during each interval, for a duration just long enough to allow measurement to be made.

The resistance of each of the respective fiber tows was measured as a function of time of exposure to 56% relative humidity conditions. As shown in the graph, the control tow, comprising fibers devoid of any salt coating thereon, exhibited a constant resistance over an exposure time of 1,000 minutes. The second tow, comprising fibers doped with 0.5% lithium chloride, maintained a constant resistance for approximately 150 minutes and then exhibited a rapid increase in resistance over the next 150 minutes, indicating that the oxidizable iron coatings on the glass filaments in that tow were being rapidly oxidized during the latter time period, with the conductive iron coating being transformed to non-conductive iron oxide. The third fiber tow, comprising fibers doped with 0.04% lithium chloride, maintained a constant resistance for 600 minutes and then exhibited a rapid increase in resistance over the next 200 minutes of exposure, indicating that oxidation of the iron coating was rapidly taking place in the latter time period.

The foregoing results show that the life of the conductive oxidizable metal coating may be controllably adjusted by selective doping levels of salt(s) on the surface of the oxidizable metal coating. Thus, for example, in chaff applications such selective doping levels may be utilized to correspondingly adjust the service life of the oxidizable metal-coated chaff fibers, consistent with the desired retention of the initial radar signature characteristic thereof for a given length of time, followed by rapid dissipation of the radar signature characteristic of such "evanescent chaff" material.

Figure 3:
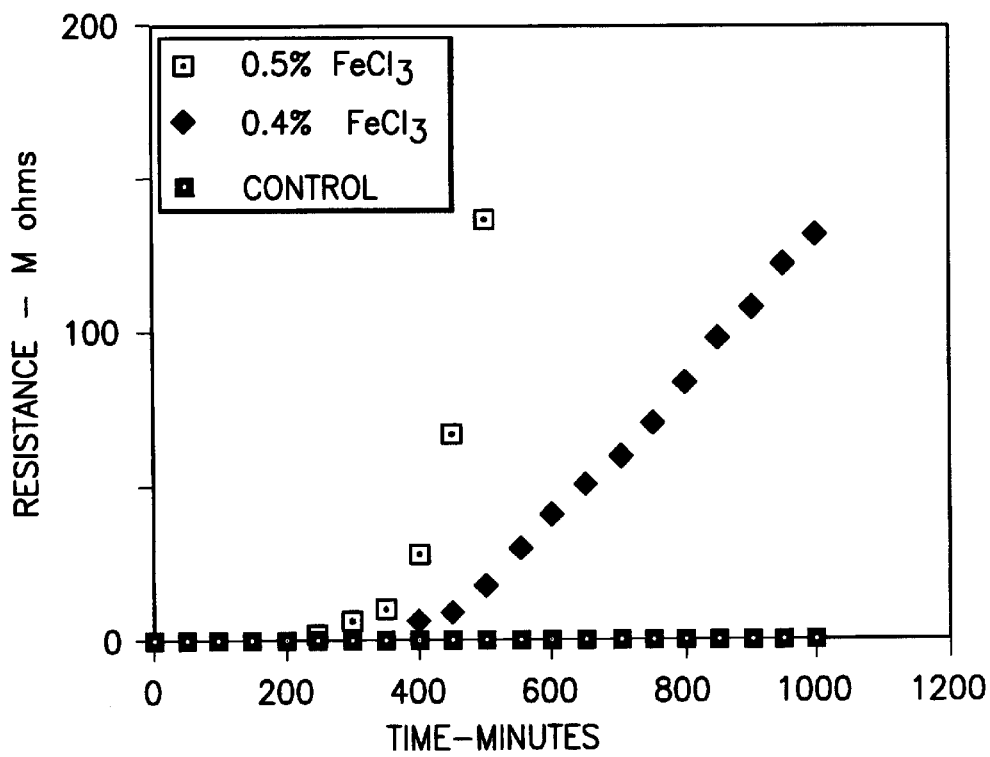
FIG. 3 is a graph of tow resistance, in Megaohms, as a function of exposure time, for a tow of iron-coated glass filaments, devoid of any salt coating, and for corresponding filament tows with 0.04% and 0.5% by weight iron (III) chloride deposited thereon, respectively, in a 58% relative humidity environment.

FIG. 3 is a graph of resistance, in Megaohms, as a function of exposure time, in minutes, for salt-doped, iron-coated glass fibers of the type described hereinabove in connection with FIG. 1, including a first tow having iron-coated fibers doped with salt by solution coating thereof with a 0.04% by weight iron (III) chloride solution, and a second tow with a coating of the same salt material derived from a 0.5% by weight solution thereof. A corresponding control, devoid of any salt coating thereon, was employed for comparison purposes.

As shown by the graph of FIG. 3, the control, having no salt coating on the iron film, exhibited a constant resistance over the full 1,000 minute exposure to 58% relative humidity conditions. The tow containing fibers coated with 0.04% iron (III) chloride solution exhibited a constant resistance for the initial 400 minutes of exposure, followed by a steady increase in the resistance over the succeeding 600 minutes of the 1,000 minute exposure. The third tow, comprising fibers coated with 0.5% iron (III) chloride solution, exhibited a constant resistance value for the initial 200 minutes of exposure, followed by exponentially increasing resistance indicating extremely rapid oxidation of the iron coating. By contrast, the tow comprising fibers coated with the 0.04% iron (III) chloride solution exhibited a substantially linear increase in resistance during oxidation, indicative of uniformly progressing oxidation of the iron coating. These data show that salt doping of the fiber may be employed to selectively adjust the useful life and conductivity decay characteristics of the oxidizable metal film coated on the substrate element.

Figure 4:
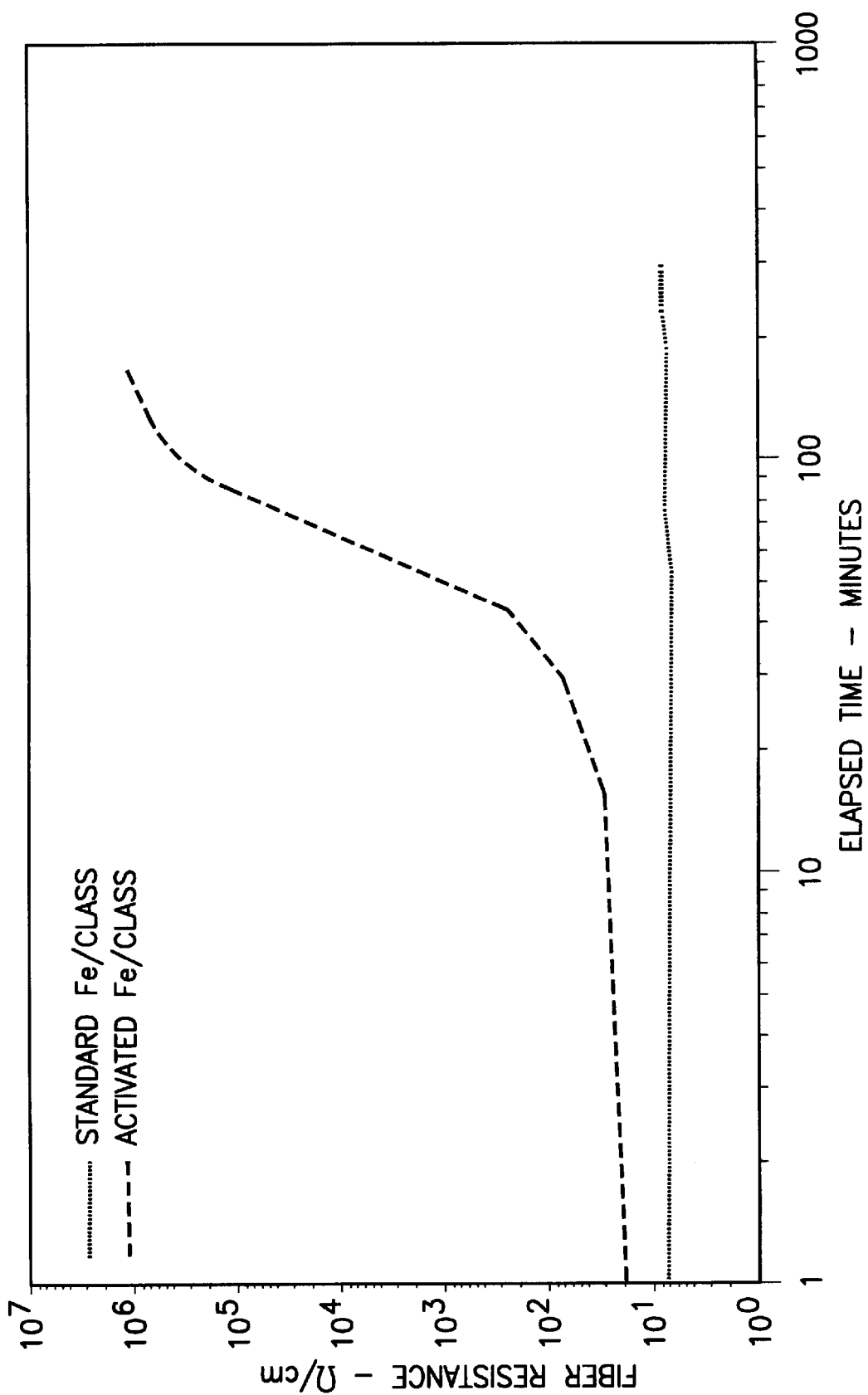
FIG. 4 is a plot of the measured fiber resistance (in ohms/cm) of an iron coated glass fiber doped with a very small amount of salt, in comparison to a corresponding undoped fiber, as a function of atmospheric exposure time, in minutes.

FIG. 4 is a plot of the measured resistance increase of an iron coated glass fiber doped with a very small amount of salt in comparison to an undoped fiber of similar construction. The untreated fiber shows relatively uniform properties well beyond five hours (and can in fact be left open to laboratory air in excess of two weeks without appreciable loss of conductivity) due to high metal purity and low surface area. However, the addition of as little as 0.02% salt by weight of the metal coating causes a rapid oxidation of the thin conductive sheath and renders the fiber electromagnetically inactive.

Figure 5:
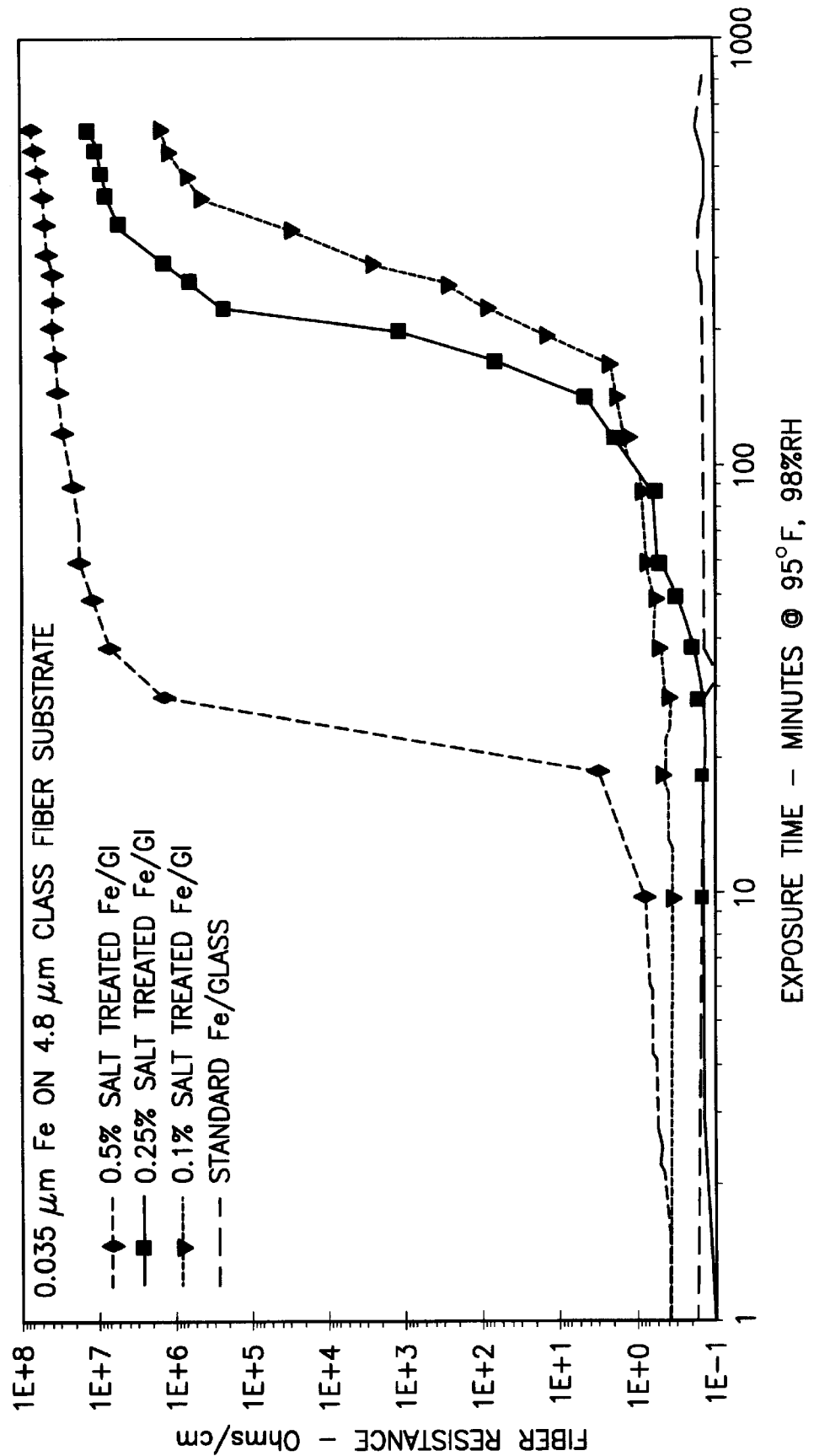
FIG. 5 is a plot of fiber resistance, in ohms/cm., as a function of exposure time at 95° F. and 95% relative humidity of various salt-doped iron-coated glass fibers in comparison to a corresponding undoped iron-coated glass fiber.

The conductive lifetime of metalized fibers can be varied by selection of the type or amount of salt applied to the metal surface. In FIG. 5, which shows a plot of fiber resistance, in ohms/cm., as a function of exposure time at 95° F. and 98% relative humidity of various salt-doped aluminum-coated glass fibers, three distinctly different conductive decay rates are shown for a constant iron coated glass fiber material with different levels of salt treatment, as specified in the plot. This figure shows the relatively unchanging resistance of an untreated Fe/Glass sample versus three activated (salt-doped) samples. The objective of salt-doping of the metallized fiber samples is to yield a 30 to 60 minute active lifetime, which in fact was achieved with the 0.5% salt solution. The two samples treated with lower salt concentrations were fairly stable for ~1 and ~2 hours.

Figure 6:
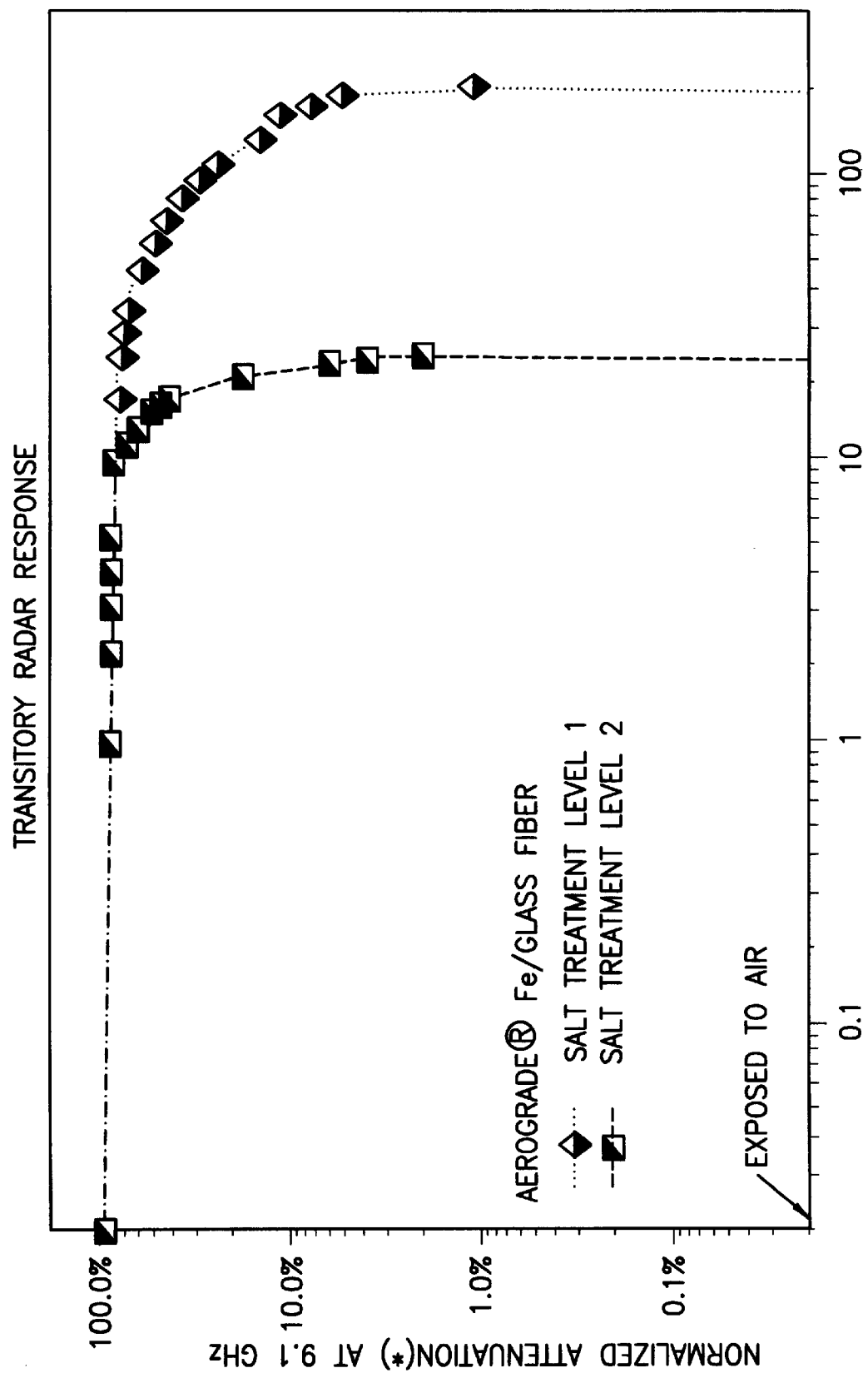
FIG. 6 is a plot of normalized attenuation of radar at 9.1 Gigaherz, as a function of exposure time at 68° F. and 50% relative humidity of various salt-doped iron-coated glass fibers.

A variety of polymers have been coated with iron using CVD, and the interaction of ironclad fibers with radar from RF to MMW frequencies has been determined. The loss of this electromagnetic radiation response from treated fibers versus atmospheric exposure time has also been demonstrated, as shown in FIG. 6, which is a plot of normalized attenuation of radar at 9.1 Gigaherz, as a function of exposure time at 68° F. and 50% relative humidity of various salt-doped iron-coated glass fibers. The two curves in this plot show loss of radar attenuation at ~30 minutes and ~3 hours for the two samples. These two samples were prepared from the identical lot of Fe/Glass fiber. The only difference between the two materials was the concentration of the salt used in the activator solution. The solution was applied and the fibers were dried under inert cover. This treatment was performed prior to packaging of the fiber. The fiber was dry when it was deployed. The handling of activated fibers for cutting and packaging is critical to their stability through storage, and up to the point of dissemination. In this respect, the chaff fiber articles require the provision of stable packaging, for storage and transport of the fiber without loss of the desired electromagnetic properties.

With the relatively high resistivity of iron achieved by CVD, iron makes a better radar attenuator or absorber than scatterer or decoy. This and the growing interest in MMW countermeasures which require higher conductivity for scatter, suggest that aluminum is a highly preferred metal for chaff applications. Table 3 shows the metal resistivities obtained versus the literature values for the bulk metals (Handbook of Chemistry and Physics, 64th edition, CRC Press, Inc., 1984). Other metals (with perhaps the exception of zinc) present difficulties in fielding due to potential health considerations.

TABLE 3

Metal Resistivities Obtained for Thin Film Coatings

| Material | Resistivity |
| --- | --- |
| Bulk Iron | 9.71 $\mu\Omega$-cm |
| CVD Iron | ~65 $\mu\Omega$-cm |
| Evaporative Iron | ~95 $\mu\Omega$-cm |
| Bulk Aluminum | 2.65 $\mu\Omega$-cm |
| CVD Aluminum | ~8 $\mu\Omega$-cm |
| Evaporative Aluminum | ~3 $\mu\Omega$-cm |

Figure 7:
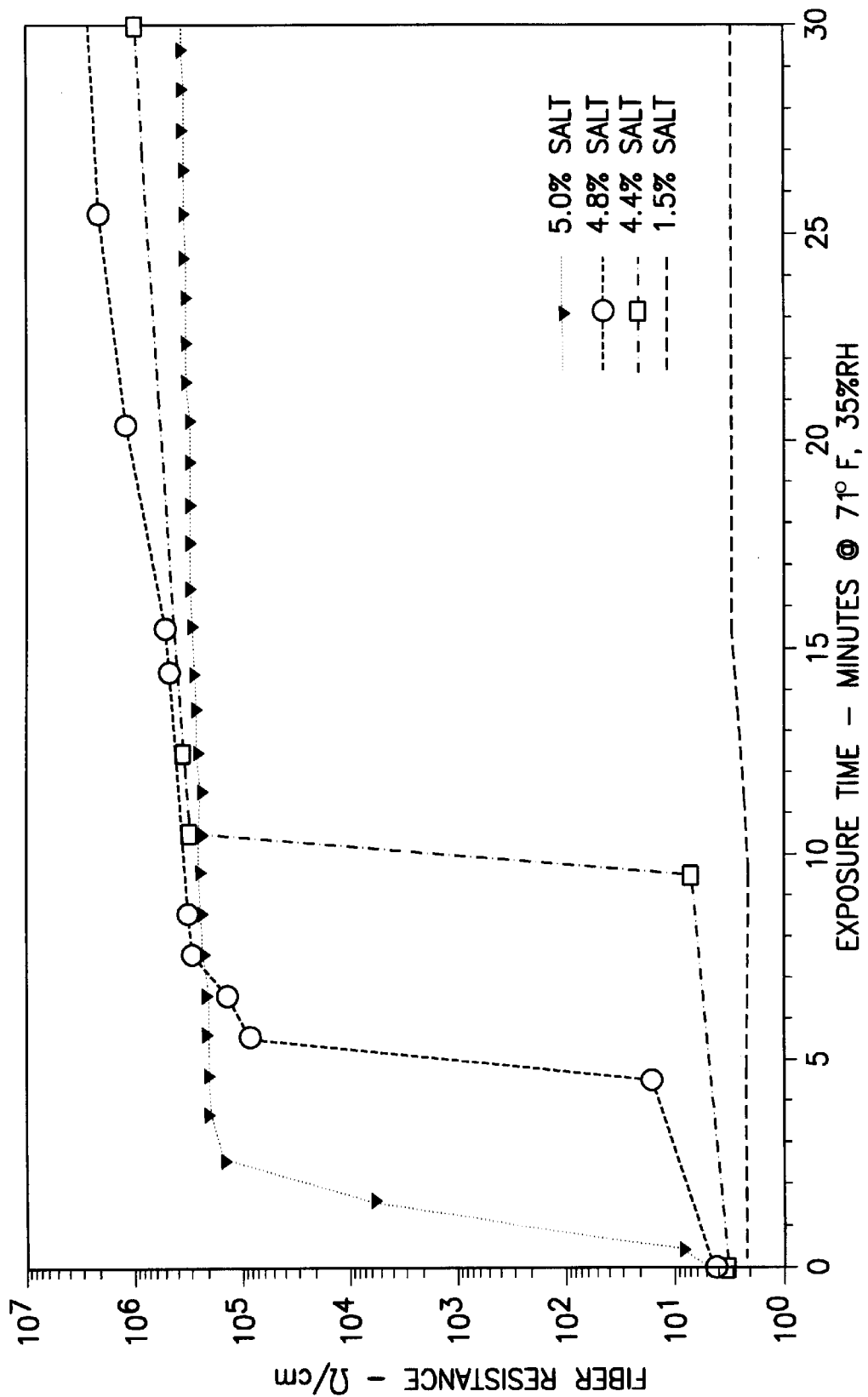
FIG. 7 is a plot of fiber resistance, in ohms/cm., as a function of exposure time at 71° F. and 35% relative humidity of various salt-doped aluminum-coated glass fibers.

Aluminum also may be deposited in thin coatings using either CVD or PVD. Metallic aluminum has been satisfactorily deposited using both techniques. Aluminum is a very conductive and low density metal which has been successfully employed in passive radar countermeasures applications for some period of time. Additionally, the conductivity of aluminum can be degraded in a controlled manner versus atmospheric exposure time, much the same as iron. As shown in FIG. 7, which is a plot of fiber resistance, in ohms/cm., as a function of exposure time at 71° F. and 35% relative humidity of various salt-doped aluminum-coated glass fibers, the rate of conductive decay of a thin aluminum coating can be varied by altering the concentration of salt in the solution used to dope the surface of the fiber.

Aluminum can for example be deposited by CVD at low temperatures using trimethylamine alane as the precursor in a hydrogen/nitrogen atmosphere. This chemistry is very attractive for aluminizing substrates of marginal thermal stability in batch operations. However, the metalization of continuous length fibers is desirably performed in a roll-to-roll process to be cost effective. The high reactivity and air sensitivity of the alane do not allow this chemistry to be done without stringent control of vacuum pressures and inert gas environment.

Aluminum can also be deposited by sputtering or E-beam assisted evaporation. The evaporative process is relatively inexpensive and is used extensively in the production of metallized mylar balloons, foil candy wrappers, and sealable metallized plastic bags for food packaging.

The evaporative aluminum process is advantageously utilized in the production of metallized articles such as chaff, due to the low cost and lack of hazardous chemicals required for deposition. There is a huge capacity for evaporative metalization of broad goods at facilities which metalize films for consumer goods. Although these processes are run with vacuum assistance, enclosed feed and take-up winding chambers enable roll-to-roll processing. These metallizers have been used in the production of coated fiber webs with good results. The process is also conducted very similarly to sputter coating as used extensively in the production of recording media (tapes, films, and discs).

In the production of aluminized fiber samples, a load-locked electron beam evaporator may be used to deposit aluminum, using for example an aluminum source in a water cooled copper hearth which is bombarded by an electron beam from an electron gun, e.g., as a specific illustrative embodiment, an Airco-Temescal STIH 270 electron gun unit, with a field of 10 KV and currents of 0.2–0.3mA (DC) being applied to volatilize the aluminum, and with a partial pressure of $5 \times 10^{-6}$ to $1 \times 10^{-7}$ Torr being maintained on the metal source throughout the coating process and $\sim 2 \times 10^{-5}$ Torr over the substrate.

Clean, smooth, and dense films of metallic aluminum may readily be obtained by such technique. Coating may be done at low substrate temperatures, and aluminum coating thickness is very controllable by altering the length of the processing time for a given set of process conditions. To illustrate this techique, fibers of 4.8 to 130 $\mu$m diameter were coated to a thickness of 0.5 to 1.0 $\mu$m (5000 to 10,000 Angstroms), to demonstrate the applicability of this process to a variety of filament diameters. Film coatings as thin as ~100 angstroms (0.01 $\mu$m) and as thick as ~10,000 angstroms (1.0 $\mu$m) were demonstrated. Uniformity of the coating on monofilament samples as well as throughout 10 to 204 count tows were evaluated.

Figure 8:
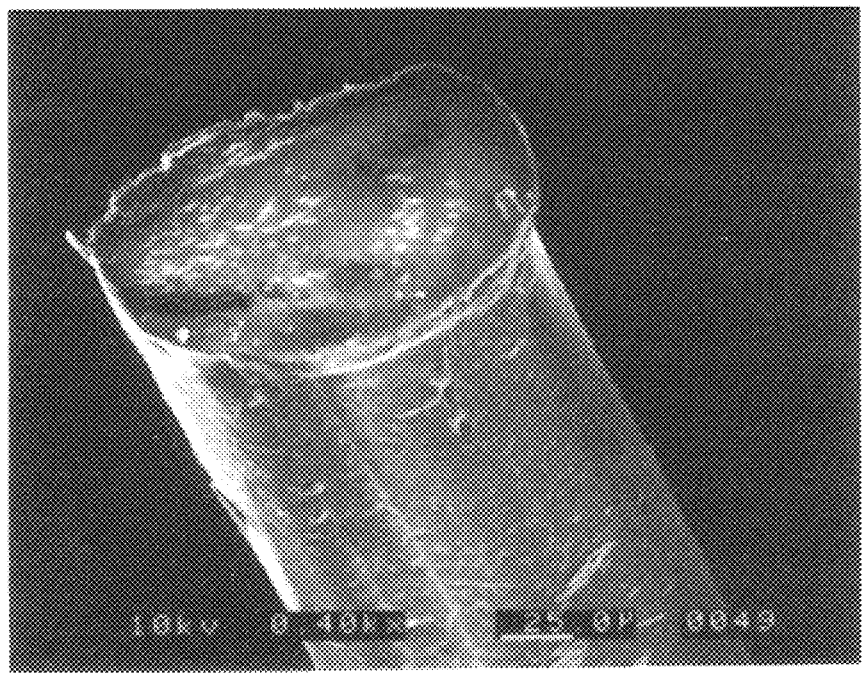
FIG. 8 is a scanning electron microscope (SEM) photomicrograph of an aluminum-coated polyvinylalcohol fiber.

The resulting metalized samples were evaluated by scanning electron microscope (SEM). FIG. 8 shows an SEM photomicrograph of an aluminum coated polyvinylalcohol (PVA) fiber (~5 mil diameter). In the figure, the fiber has a metal film coating which is approximately 1 $\mu$m thick and covers the fiber in a near 360° sheath. Since the process is a line-of-sight technique, not all fibers prepared in the process show total circumferential coating. However, electromagnetic models suggest that the most important property of countermeasures fibers is the resistance per unit length. In other words, a non-circumferential (or half-coat) coated fiber can scatter as well as a metal sheathed (or full-coat) fiber if the resistivity, cross-section, and the length of the metal are not changed.

Figure 9:
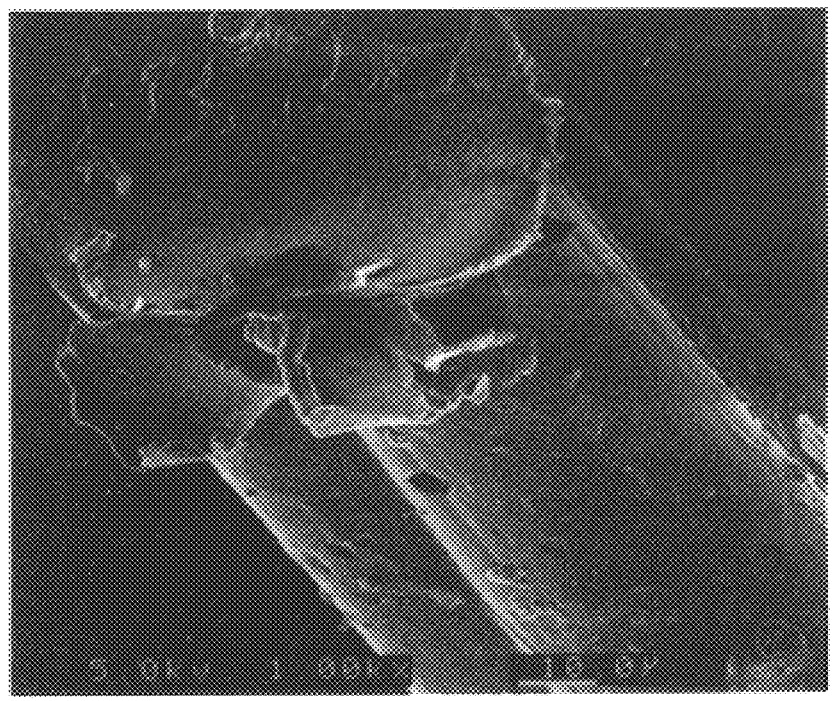
FIG. 9 is a SEM photomicrograph of an aluminum-coated chitosan fiber.
Figure 10:
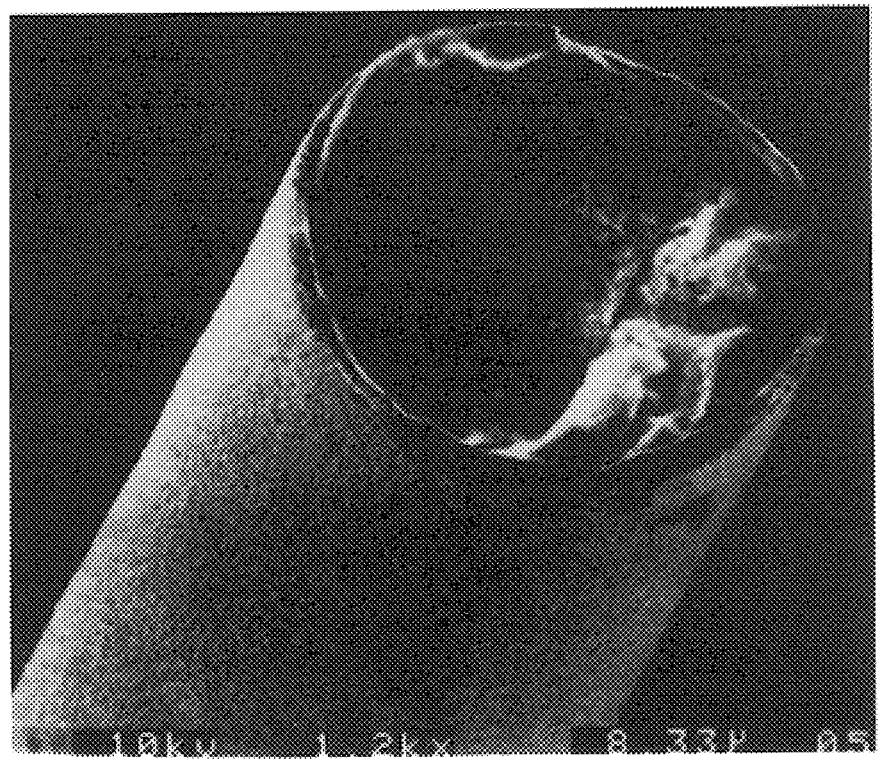
FIG. 10 is a SEM photomicrograph of an aluminum-coated soluble glass fiber.
Figure 11:
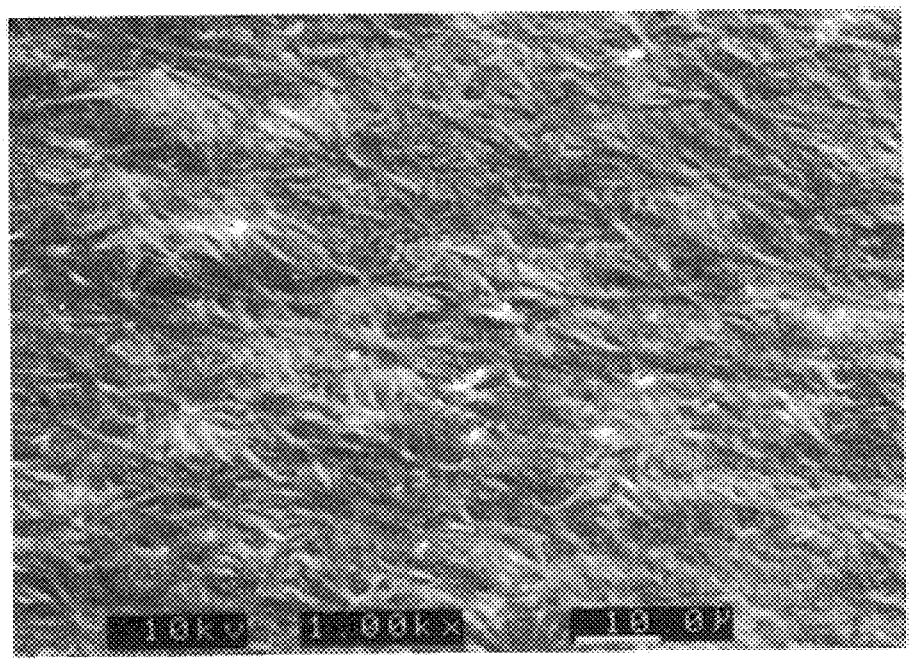
FIG. 11 is a SEM photomicrograph of a portion of a starch film coated with aluminum.
Figure 12:
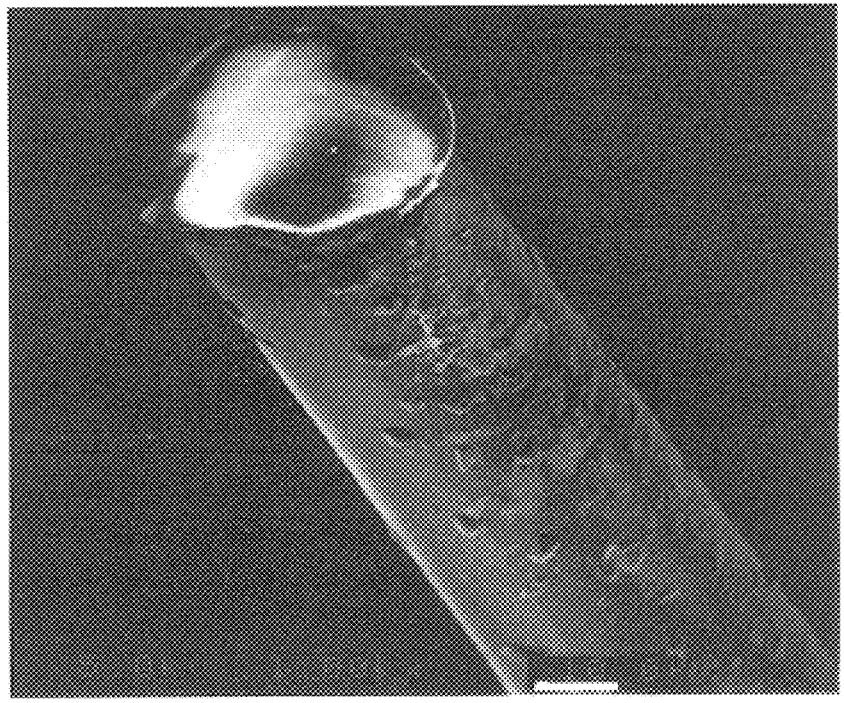
FIG. 12 is a SEM photomicrograph of an aluminum-coated polyester fiber.

FIGS. 9 and 10 depict metallized (aluminized) fibers of chitosan and soluble glass. FIG. 11 shows a photomicrograph of a portion of a strip of starch film coated with aluminum, and FIG. 12 shows a metallized (aluminized) polyester fiber.

A summary of the resistances achieved in metallization trials targeting 0.5 $\mu$m of aluminum, is set out in Table 4 below, showing acetate, starch and starch blends, chitosan, PVA, and soluble or absorbable glasses, to be preferred substrate materials to environmentally degradeable metal-coated article applications.

TABLE 4

Results of Candidate Metalization Trials

| Substrate | Form | Unit Measured | R($\Omega$/cm) |
|---|---|---|---|
| Acetate | Multifilament | 1 tow | 26 |
| | | 4 single filaments | -, -, 47, - |
| Brunswick Fiber | Multifilament | 1 tow | 'over' |
| | | 3 single filaments | 'over' |
| Cellulon | Film | 4 cm length | 1–2 |
| Cellulose Acetate | Film | 2" distance on square | <1 |
| Cellulosic Fiber | Multifilament | 1 tow | 71 |
| | | 3 single filaments | 'over' |
| Chitosan | Multifilament | 4 single filaments | 54, -, 33, 1 |
| Chitosan Acetate | Film | 2" distance on rectangle | 1–4 |
| Cotton | Staple | 4 single filaments | 'over' |
| Earthguard ® | Monofilament | 4 filaments | 9, 30, 3, 42 |
| Glass | Multifilament | 1 tow | 'over' |
| | | 3 single filaments | 'over' |
| Hollow Glass | Multifilament | 1 tow | 'over' |
| | | 4 single filaments | 5 |
| Mater-Bi ® | bag/film | 1" distance, all directions | 1–49 |
| Novon ® | Multifilament | 1 tow | 9164531 |
| | | 4 single filaments | 'over' |
| Nylon | Multifilament | 1 tow | 'over' |
| | | 4 single filaments | 'over' |
| | Monofilament | 1 filament | 18 |

TABLE 4-continued

Results of Candidate Metalization Trials

| Substrate | Form | Unit Measured | R($\Omega$/cm) |
|---|---|---|---|
| Nylon, doped | Monofilament | 4 monofilaments | 1, 3, 5, 2 |
| PolyAcryloNitrile | 1 k tow | 1 tow | 121 |
| | | 4 single filaments | 'over' |
| PolyCaproLactone | Film | 2" distance on square | 3 |
| Polyester | Monofilament | 4 monofilaments | 25, 25, 34, 26 |
| | Multifilament | 1 tow | 'over' |
| | | 4 single filaments | 122, -, -, - |
| PolyEtherEtherKetone | Multifilament | 1 tow | 30 |
| | | 4 single filaments | 98, -, -, - |
| | Monofilament | 4 monofilaments | 86, 34, 35, - |
| PolyEtherImide | Multifilament | 1 tow | 23 |
| | | 4 single filaments | 51, 53, -, - |
| PolyLacticAcid | Film | 2" distance on square | <1 |
| PolyPhenyleneSulfide | Multifilament | 1 tow | 'over' |
| | | 3 single filaments | 'over' |
| PTFE (Teflon Tape) | Tape/Film | 3" distance on rectangle | 4–13 |
| PolyVinylAlcohol | Monofilament | 4 monofilaments | 1338, -, 47, 725 |
| | Hickory Tow | 1 tow | 30 |
| | | 4 single filaments | 91, -, -, - |
| 120° F. soluble | FSI Tow | 1 tow | 76 |
| | | 4 single filaments | -, -, -, 400 |
| Pre-Ox Carbon | Multifilament | 1 tow | 10 |
| | | 4 single filaments | 'over' |
| Rayon | Staple | 1/3 tow | 19 |
| | | 4 single filaments | 'over' |
| Silk | Staple | 1/4 tow | 123 |
| | | 4 single filaments | 'over' |
| Soluble Glass | Multifilament | 2 tows | 59M, 12M |
| Starch | Strips | 10 cm length | 2 |
| Wool | Staple | 1 tow | 371 |

In many cases in the preparation and measurement of the samples identified in Table 4, a few different samples of a particular substrate were metallized, each having been subjected to a different pretreatment. After the first coating trials, in which outgassing of the substrates was observed, all samples were heated and/or evacuated prior to metalization. This allowed most of the retained moisture to escape before the experiments were conducted, resulting in quicker pump-down times and better coating adhesion. In addition to this basic procedure, three other pretreatment methods were employed to predispose the polymeric surfaces to metallization. The first was the application of tetraethoxysilane (TEOS), the second involved an electroless copper plating solution, and the third consisted of stannous and palladium chlorides activators. In all three methods, the fibers were simply dipped into the solutions momentarily and then dried and/or evacuated in the usual manner. The most consistent pretreatment among all the materials was the TEOS, which significantly improved the coating in almost every case.

The TEOS (or sol-gel) treatment is also considered to be the least environmentally offensive of the pretreatment schemes. The application and drying process results in a fresh but very thin (<0.001 $\mu$m), slightly acidic, and porous silica coating on the fiber surface. This porous film coating is not visible to SEM inspection below 50,000× and is not expected to alter degradability. This technique employs a colloidal suspension of fine particles (in this case polysilicates) or sol, which can yield a gel (a 3 dimensionally cross-linked inorganic polymer) when the solution is removed. Further washing, drying, and densification produces a solid ceramic material.

In addition to electrical evaluation, all metallized substrates were subjected to SEM evaluation for a qualitative indication of coating quality. Coating morphology, density, adhesion, and thickness were all used to evaluate success of the metalization. Although all runs targeted the same metal thickness, the average amount of metal on the substrates varied slightly due to effects such as overlap of filaments and outgassing. Outgassing also caused vapor phase decomposition which yielded dusty and non-adherent coatings on some samples. Materials which exhibited good metal adhesion with a smooth, dense coating include acetate, chitosan, doped nylon, PVA, starch film, soluble glass, polyester, and PEI. Of these samples, the only one that did not have good resistance measurements was the soluble glass, which had a thinner coating than the others. This decreased coating thickness is probably due to the lack of evacuation prior to coating, and the anticipated moisture pick-up as a result of slightly prolonged exposure to the atmosphere. It is also suspected that some oxidation of the metal may have occurred in the deposition due to the moist air degassing from the fiber surface. Proper pretreatment and handling of these fibers has shown that more uniform, dense metallic coatings are achievable with adequate environmental control.

Figure 13:
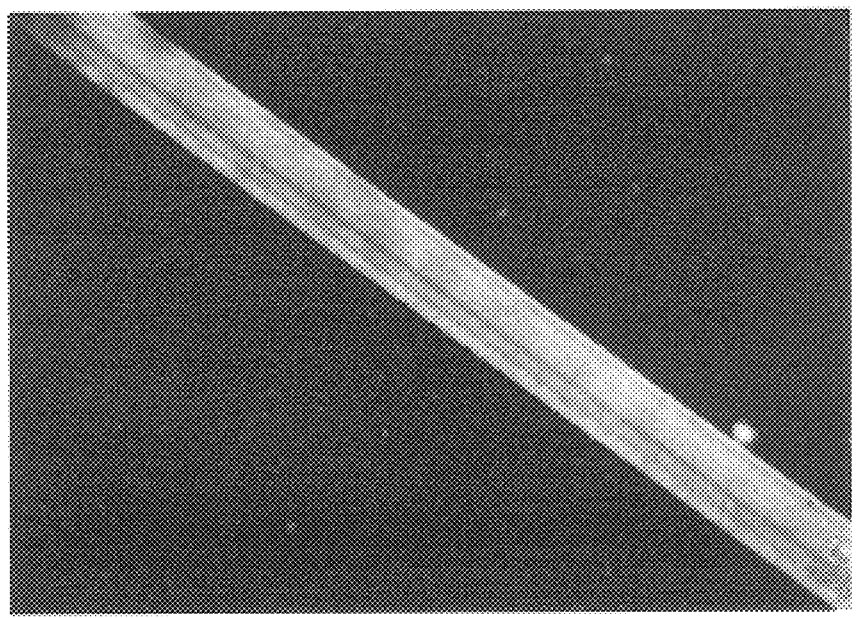
FIG. 13 is a SEM photomicrograph of a soluble glass fiber.
Figure 14:
FIG. 14 is a SEM photomicrograph of the soluble glass fiber of FIG. 13, 20 seconds after water droplet exposure.
Figure 15:
FIG. 15 is a SEM photomicrograph of the soluble glass fiber of FIG. 13, 30 seconds after water droplet exposure.

FIG. 13 is a SEM photomicrograph of a soluble glass fiber. FIG. 14 is a SEM photomicrograph of the soluble glass fiber of FIG. 13, 20 seconds after water droplet exposure. FIG. 15 is a SEM photomicrograph of the soluble glass fiber of FIG. 13, 30 seconds after water droplet exposure.

Figure 16:
FIG. 16 is a SEM photomicrograph of an aluminized soluble glass fiber, 20 seconds after water droplet exposure.
Figure 17:
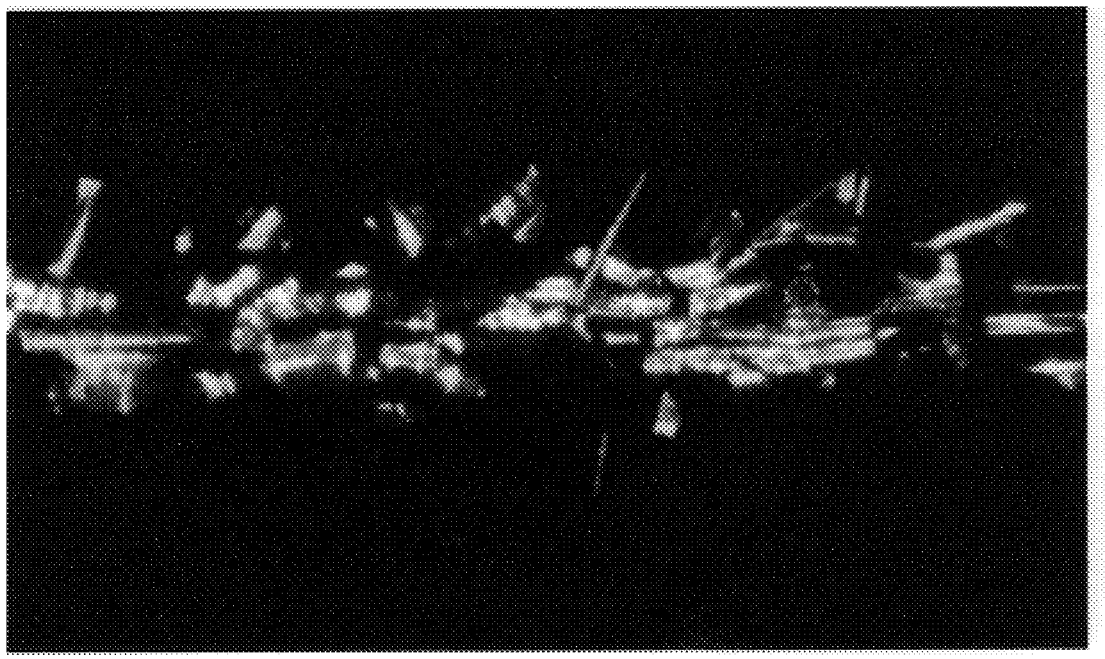
FIG. 17 is a SEM photomicrograph of the aluminized soluble glass fiber of FIG. 16, 30 seconds after water droplet exposure.

FIG. 16 is a SEM photomicrograph of an aluminized soluble glass fiber, 20 seconds after water droplet exposure. FIG. 17 is a SEM photomicrograph of the aluminized soluble glass fiber of FIG. 16, 30 seconds after water droplet exposure. Like the uncoated substrate fiber, the dissolution by the water is obvious in this short time frame. The fiber is attacked by the water despite a circumferential metal coating. The rapid volume change in the fiber causes the metal coating to fracture and spall from the surface. Small metal fragments, ribbons, coils, and strips are apparent in the photos. The metal in these photos was not treated for rapid oxidation, but the sudden increase in surface area is favorable to the oxidative decay of the metal.

Figure 18:
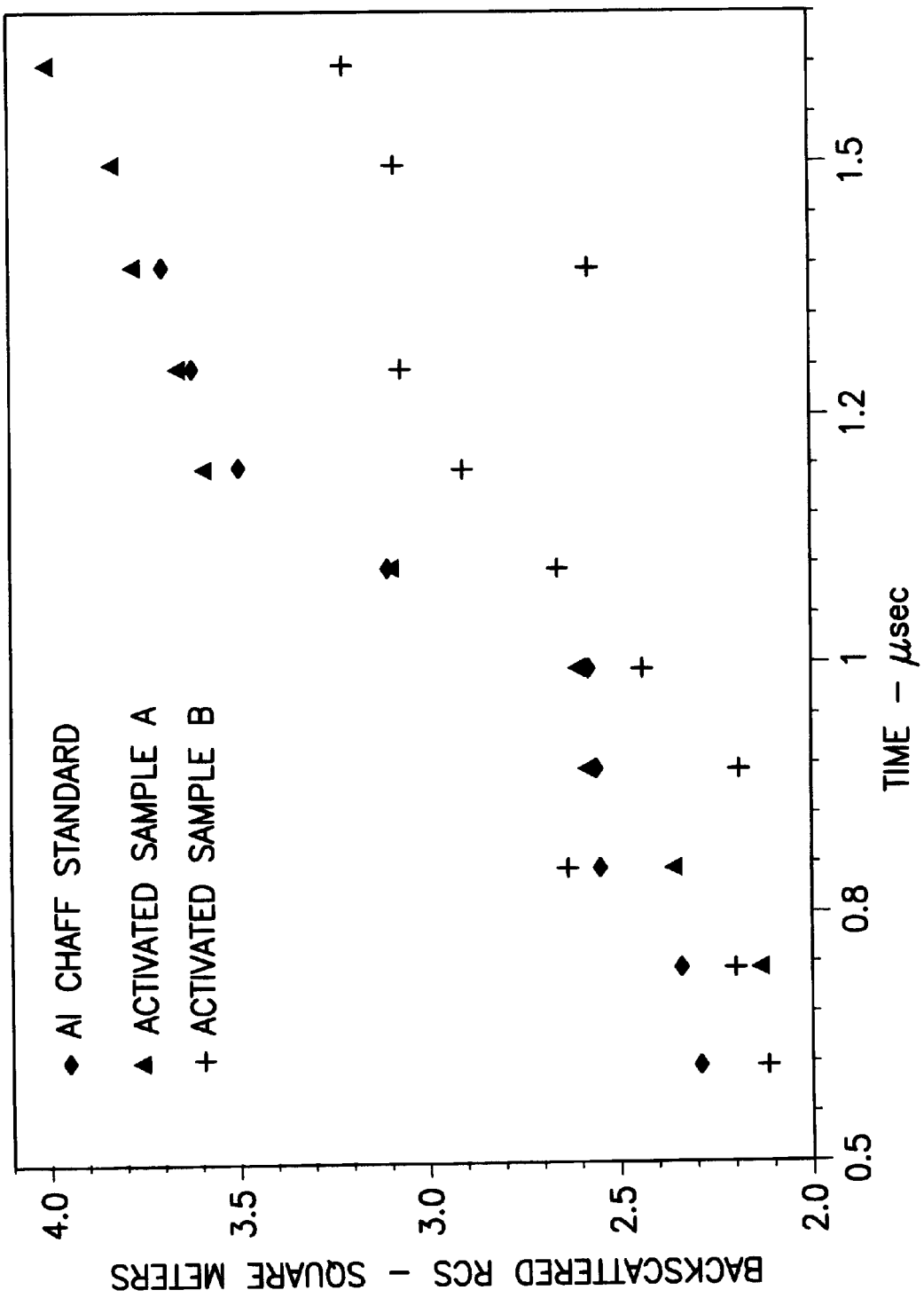
FIG. 18 is a plot of backscattered reflectivity cross section, in square meters, as a function of time in microseconds, for salt-doped aluminum-coated glass fiber chaff samples in comparison to corresponding undoped aluminum-coated glass fiber, showing the initial response of chaff clouds of the various samples.

FIG. 18 is a plot of backscattered reflectivity cross section, in square meters, as a function of time in microseconds, for salt-doped aluminum-coated glass fiber chaff samples (Activated Sample A, Activated Sample B) in comparison to corresponding undoped aluminum-coated glass fiber (Al Chaff Standard), showing the initial response of chaff clouds of the various samples.

Figure 19:
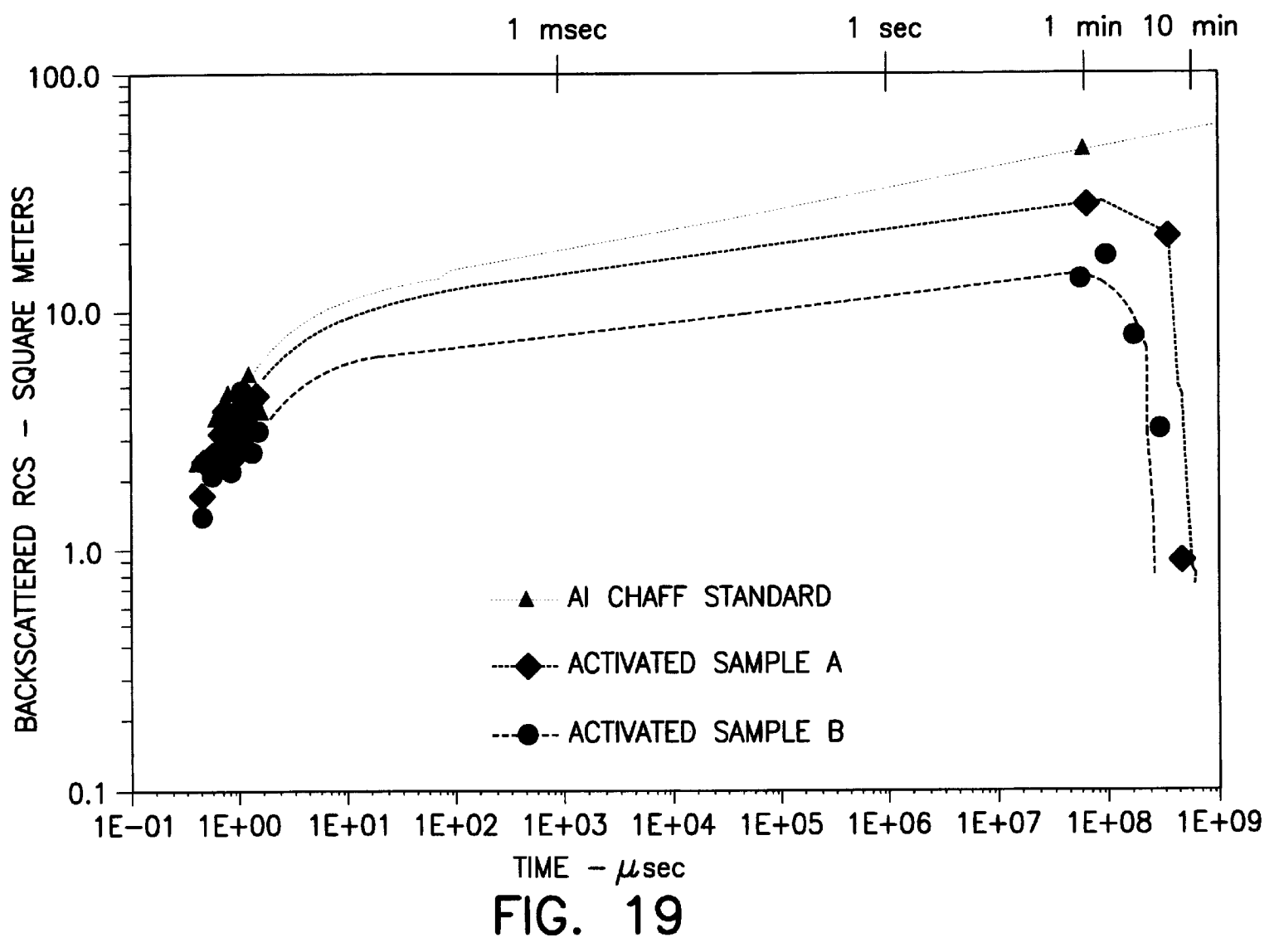

FIG. 19 is a plot of backscattered reflectivity cross section, in square meters, as a function of time in microseconds, for the chaff clouds of FIG. 18, showing the dissipation of the radar reflectivity of the salt-doped aluminum-coated glass fibers. The FIG. 19 plot shows that after ten minutes the radar reflectivity of the salt-treated aluminized glass fiber chaff had disappeared.

FIGS. 20–23 show the dissolution of a group of four metallized polyvinylalcohol filaments approximately 75 microns in diameter, in room temperature faucet water over a 5 minute time frame.

Figure 20:
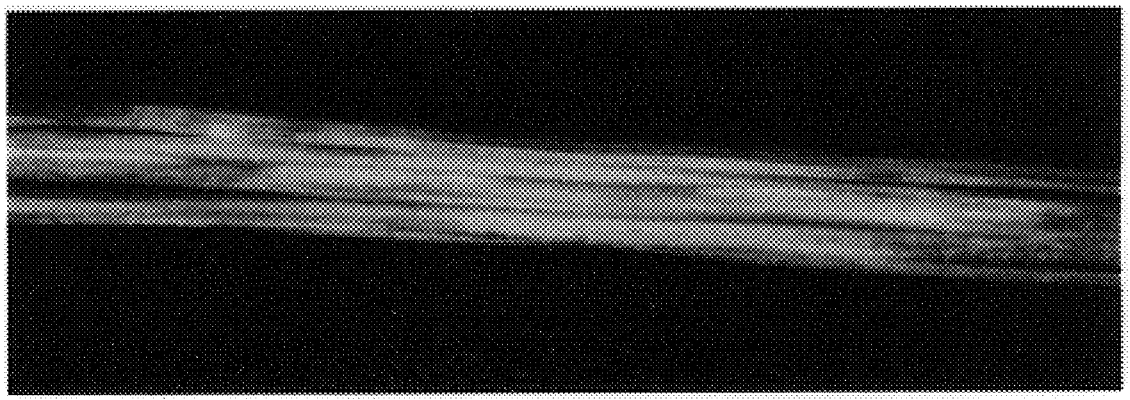
FIGS. 20–23 show the dissolution of a group of four metallized polyvinylalcohol filaments in room temperature faucet water over a 5 minute time frame.
Figure 21:
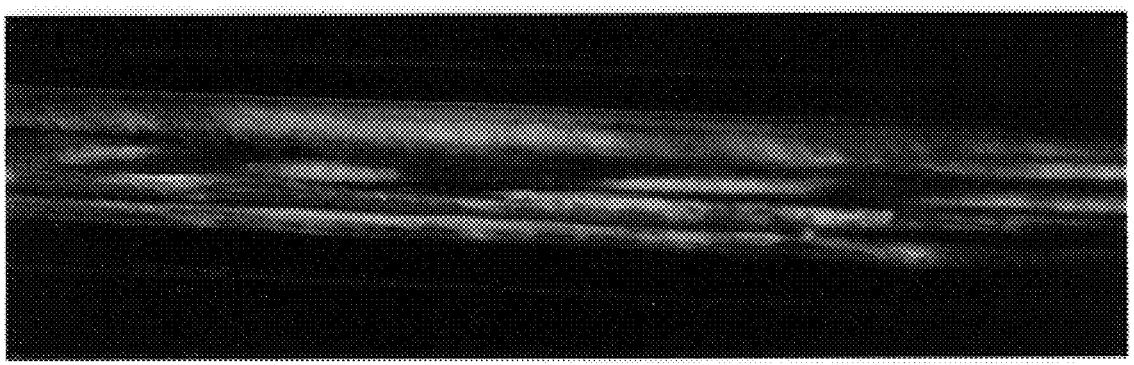
Figure 22:
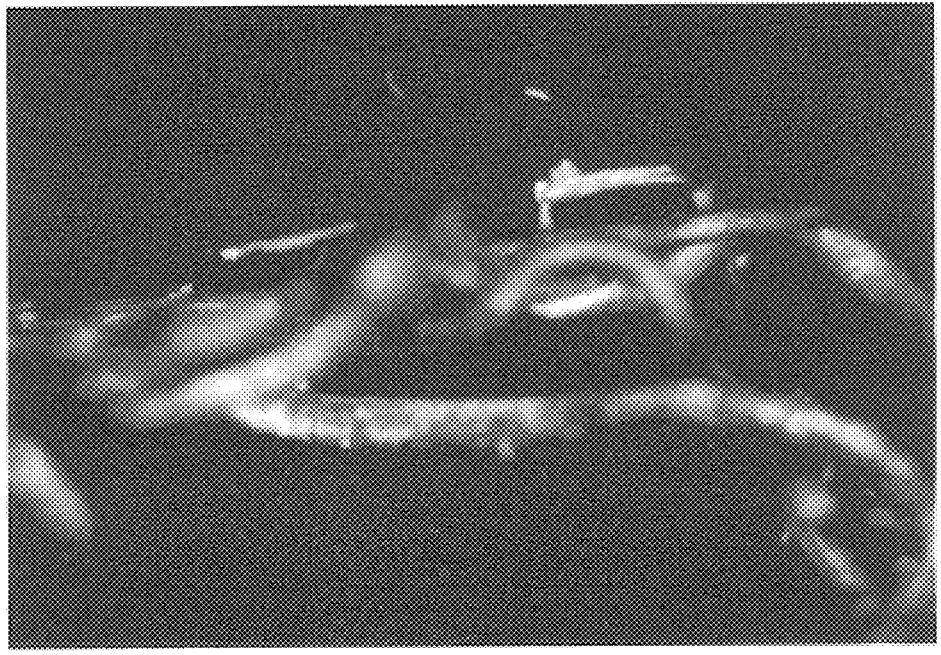
Figure 23:
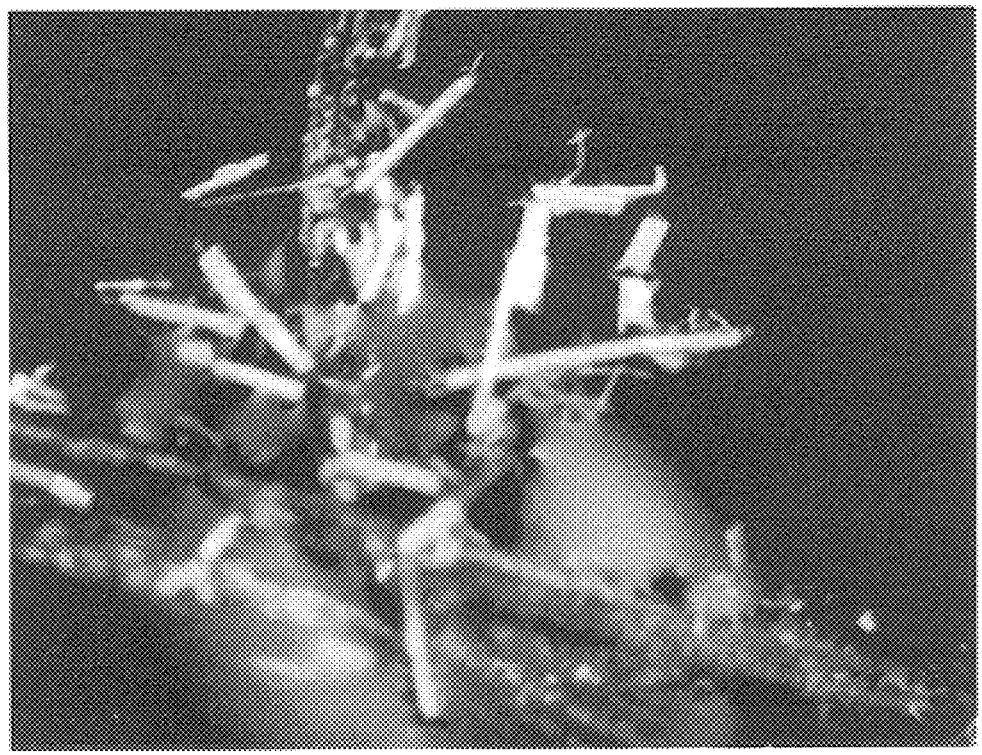

FIG. 20 shows the aluminized PVA fiber without water exposure, and FIGS. 21–23 show the fibers 30 seconds, 2 minutes and 5 minutes, respectively, after a drop of water has been placed on the fiber bundle. The metal coating does not prevent the dissolution of the fiber. The water droplet attacks the PVA causing rapid and severe volume changes, which in turn deteriorate the structural integrity of the metal coating. The metal coating then fractures and peels from the PVA substrate, making water attack on the substrate easier. After 5 minutes in exposure to water, very little PVA remains.

Figure 24:
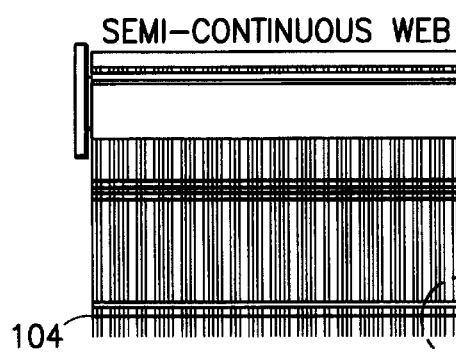
FIG. 24 is a schematic view of a multifilament fiber semi-continuous web suitable for mass production metallization of fiber tows.

FIG. 24 is a schematic view of a multifilament fiber semi-continuous web 100 suitable for mass production metallization of fiber tows 102. As shown, the metal tows 102 are bound in the semi-continuous web 100 by means of transverse band members 104, with each tow 102 comprising a multiplicity of filaments 108.

The conformation of the tows of filaments in the structure shown in FIG. 24 is highly advantageous in effecting metallization of the tows and filaments therein, since the web has a gross planar character. By this conformation the web can readily be passed through a metallization (metal deposition) process, in a high volume, mass production fashion.

Figure 25:
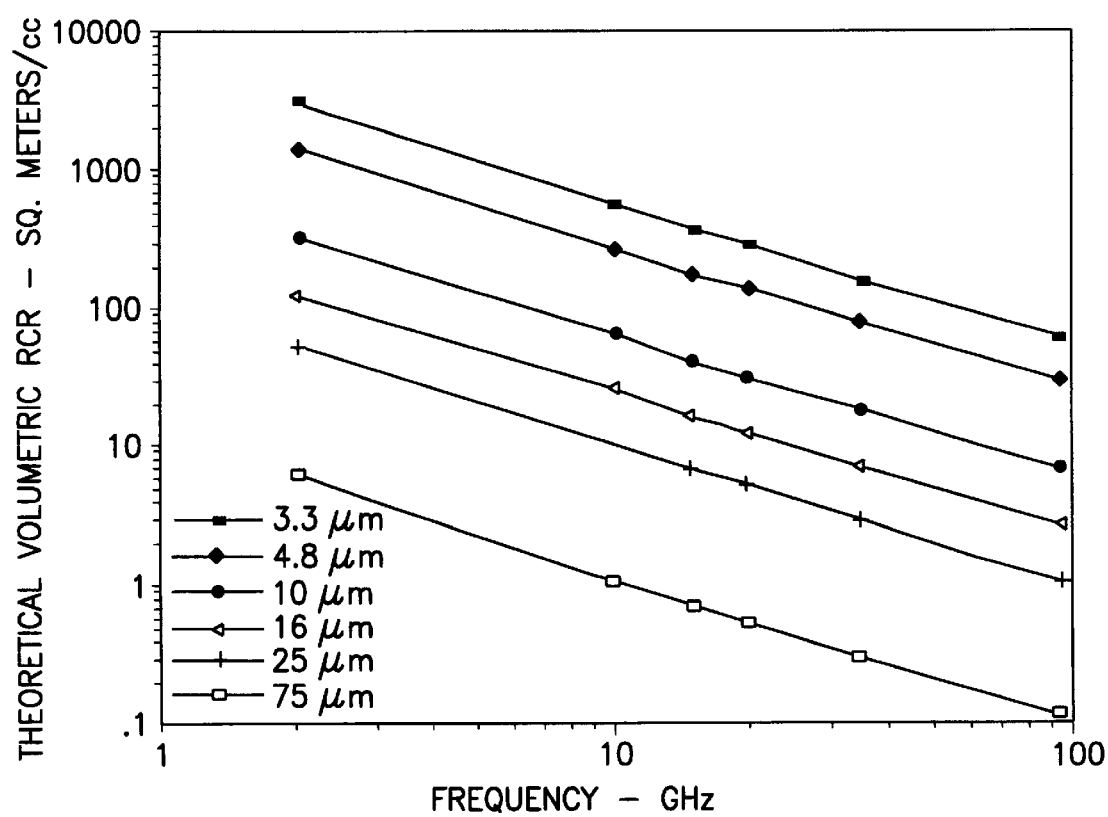
FIG. 25 is a plot of theoretical volumetric reflectance cross section, in square meters/cubic centimeter, as a function of radar frequency, in Gigaherz, for various chaff fiber diameters.

FIG. 25 is a plot of theoretical volumetric reflectance cross section, in square meters/cubic centimeter, as a function of radar frequency, in Gigaherz, for various chaff fiber diameters. Chaff loads are generally limited by the volume which can be fit into a given number of dispensing containers, for subsequent dissemination. The volume efficiency of the chaff material is therefore highly important. At comparable chaff dipole resistance, chaff performance will decline with increasing fiber diameter, as shown in the plot. It will be recognized that the specific diameter as well as length and aspect ratio (length/diameter) of the chaff articles in the practice of the present invention may be widely varied, consistent with the desired radar characteristics, exposure conditions, and surface metal and optional dopant (salt) species and structure, etc.

Figure 26:
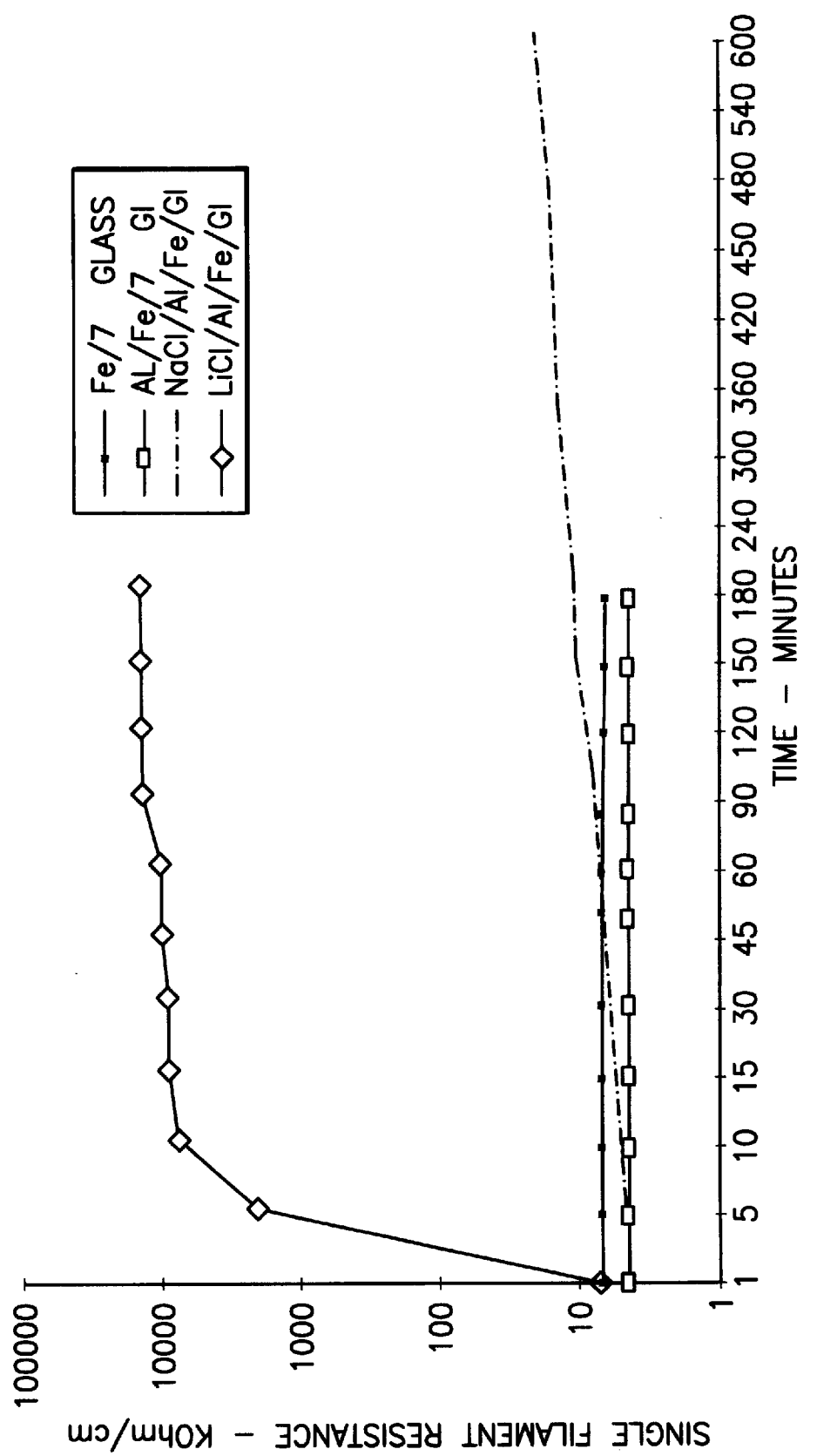
FIG. 26 is a plot of single filament resistance, in Kiloohms/cm, as a function of atmospheric exposure time, in minutes, for iron-coated glass filament, and aluminum-overcoated iron-coated glass filament, both undoped and with salt doping of the aluminum-overcoated iron-coated glass filament.

FIG. 26 is a plot of single filament resistance, in Kiloohms/cm, as a function of atmospheric exposure time, in minutes, for iron-coated glass filament, and aluminum-overcoated iron-coated glass filament, both undoped and with salt doping of the aluminum-overcoated iron-coated glass filament.

In an embodiment of the invention utilizing multiple metal coating layers on the substrate, fibers previously coated with 0.035 $\mu$ of iron via CVD were overcoated with ~250 Angstroms of aluminum, to increase the single filament conductivity of the iron-coated glass fibers while maintaining evanescent properties of the conductive iron. At coating thicknesses of ~200 Angstroms and below, the aluminum films tend to be discontinuous, leaving the metallic iron exposed to the environment and allowing oxidative corrosion.

To demonstrate the ability of aluminum coatings to become non-conducting with environmental exposure, iron-coated glass and aluminum-overcoated iron-coated glass fibers (7 microns in diameter) were prepared, and evaluated with and without salt modifiers in a controlled humidity environment with fiber resistance being recorded as a function of exposure time, FIG. 26 shows the results. Both the iron coated fiber and the aluminum overcoated iron coated fiber demonstrate very slow resistance rise without surface modification.

However, doping with either NaCl or LiCl expedites oxidation of the metal coatings. The sample treated with LiCl showed very rapid loss of conductivity while degradation of the NaCl treated sample was much slower.

Figure 27:
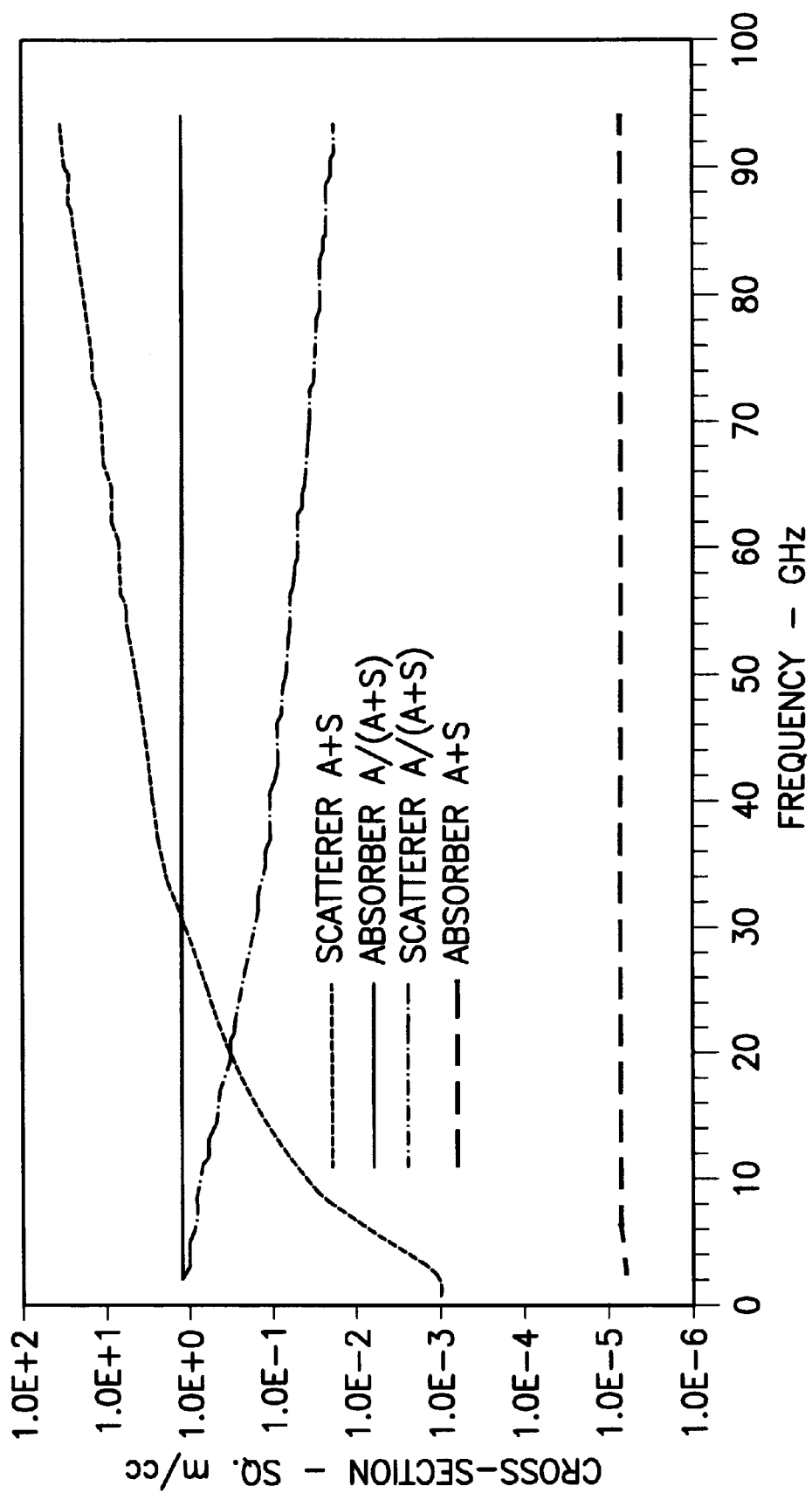
FIG. 27 is a plot of radar response cross-section, in square meters/cubic centimeter, as a function of radar frequency, in Gigaherz, for radar absorbance (A) and scattering (S) response modes of metal coated fibers.

FIG. 27 is a plot of radar response cross-section, in square meters/cubic centimeter, as a function of radar frequency, in Gigaherz, for radar absorbance (A) and scattering (S) response modes of metal coated fibers.

In exposure of metal coated substrate articles of the invention, to radar or to other types of electromagnetic radiation, scattering and absorption will always coexist. As frequency increases, even carbon fibers will begin to scatter a significant amount of the incident radar energy, and absorb less. Since scattering, even by non-resonant dipoles, is increasingly more efficient than absorption at millimeter wavelengths it may be desirable to target millimeter wave (mmw) scattering as an effective electronic warfare countermeasure in addition to millimeter wave absorption. FIG. 27 shows a plot of frequency dependent radar interaction for metal coated fibers designed to perform as either an efficient scatterer, and a low-reflectivity absorber. Within the geometries explored in this discussion, nearly any material designed to exhibit a maximized absorption to scatter ratio will do so at the expense of total extinction. Likewise, nearly any material optimized for maximum mmw attenuation will show increased scattering. Metal coated fibers thus have the potential to provide countermeasures at either end of this "spectrum" or to bridge the gap between them.

Small diameter, high aspect ration iron-coated glass fibers make them good absorbers at low frequencies. The ability of very thin coating to give good mmw attenuation facilitates the rapid elimination of response by metal film oxidation. Thinly coated aluminized glass can potentially produce better attenuation at high frequencies where greater conductivity is desired.

In a good conductor, high frequency currents will flow almost exclusively in a thin layer on the conductor surface. As conductivity is increased toward infinity, the thickness of this layer (skin depth) approaches zero. To maximize electromagnetic damping and other energy loss or frequency altering mechanisms, metal coating thickness or effective diameter of a conductor is preferably small in comparison to this skin depth, i.e., metal thickness (t)<skin depth (d). For scattering, the opposite is desired. Ideally for reflective chaff, t>d and the effective conductor diameter $(d_{\text{eff}})$>=4d. Aluminized glass chaff has, to our knowledge, not previously been utilized with thin metal coatings and small diameter substrates for enhanced radar absorption. Skin depth can be approximated by the following equation:

$$\delta = 2/(\pi f \mu_0 S)^{1/2}$$

where: $\delta$ is skin depth in cm

S is conductivity in Mhos/m $\mu_0$ is the permeability of free space=$4\pi \times 10^{-7}$ Henry/m $f$ is frequency in Hz CVD iron coatings on glass filaments in tow form may be prepared having a resistivity of 50 to 100 $\mu\Omega$-cm (with a mean of ~65 $\mu\Omega$-cm), based on DC resistance measurements and weight of metal pick-up on a fiber tow. Using these numbers, skin depths in microns are calculated to be approximately those shown in the "CVD Fe" column of Table 2. Coating thickness is routinely between 0.035 and 0.055 $\mu$m which is measurably less than the skin depth across this frequency regime, favoring absorption. The adjacent column ("Aluminum") shows the skin depths for aluminum using an average value of 7.8 $\mu\Omega$-cm for the deposited aluminum resistivity. Since aluminized glass fiber chaff has a coating thickness of ~2.3 $\mu$m (nominally>1 $\mu$m but ranging from ~0 to ~6$\mu$m on "half-coat" and ~1 to ~3 $\mu$m on "full-coat") and an effective diameter of nearly 16 $\mu$m, scattering is predominant across the spectrum range.

TABLE 5

Metal Coating Skin Depths

| Frequency (GHz) | CVD Fe ($\mu$m) | Aluminum ($\mu$m) | Bulk Fe ($\mu$m) |
|---|---|---|---|
| 2 | 5.26 | 1.82 | 2.03 |
| 8 | 2.63 | 0.91 | 1.02 |
| 10 | 2.35 | 0.82 | 0.91 |
| 17 | 1.81 | 0.63 | 0.70 |
| 35 | 1.26 | 0.44 | 0.49 |
| 94 | 0.77 | 0.27 | 0.30 |
| 140 | 0.63 | 0.22 | 0.24 |

Altering the metal thickness enables the ratio of absorption to scatter to be altered; thinner aluminum coatings can provide effective absorption. The final column (Bulk Fe) in Table 2 shows skin depths if iron resistivity were dropped to ~9.7 $\mu\Omega$-cm, the literature value for bulk iron. MMW scattering can be enhanced for iron-coated glass at thicknesses of 0.3 to 0.5 $\mu$m. For example, on a 4.8 $\mu$m substrate fiber, this yields an effective (collapsed) coating diameter of ~2.5 $\mu$m. These thicknesses are not very practical by CVD, but may be obtainable with evaporative coating.

In some instances in which the salt-doped, oxidizable metal-coated substrate is subjected to contact with other coated articles, or otherwise to abrasion prior to actual deployment, it may be desirable to overcoat the salt coating with a material serving as a fixative for the salt coating, to prevent damage to the salt coating as a result of abrasion or other contacts which would otherwise serve to remove the applied salt material. For example, a porous gel coating or binder material may be applied to the salt-coated oxidizable metal film, for the purpose of adheringly retaining the salt coating in position on the oxidizable metals film. The overcoat may generally be of any suitable material which does not adversely affect the respective salt and oxidizable metal coatings for the intended purpose of the coated product article. For example, it may be desirable to provide an outer coating comprising material selected from the group consisting of polysilicate, titania, and/or alumina, formed on the salt-coated oxidizable metal film from a sol gel dispersion of the polysilicate, titania and/or alumina material, as more fully disclosed and claimed in U.S. Pat. No. 5,087,515, for "CHAFF FIBER COMPRISING INSULATIVE COATING THEREON, AND HAVING AN EVANESCENT RADAR REFLECTANCE CHARACTERISTIC, AND METHOD OF MAKING THE SAME," the disclosure of which is hereby incorporated herein by reference.

As used herein, the term "oxidizable metal" is intended to be broadly construed to include elemental oxidizable metals per se, and combinations of any of such elemental metals with each other and/or with other metals, and including any and all metals, alloys, eutectics, and intermetallic materials containing one or more of such elemental oxidizable metals, and which are depositable in sub-micron thickness on a substrate and subsequent to such deposition are oxidizable in character, Although iron and aluminum are preferred oxidizable metals in the practice of the present invention, and the invention has been primarily described herein with reference to iron-coated glass filaments, it will be recognized that other metals such as nickel, copper, aluminum, zinc, and tin may be potentially usefully employed in similar fashion. It will also be recognized that the substrate element may be widely varied, to comprise the use of other substrate element conformations and materials of construction.

In the use of nickel, copper, zinc, and tin as oxidizable metal constituents, preferred salt species may vary from those described above, which are disclosed as being applicable to the invention and preferred in application to iron, but in the context of the broad range of preferred oxidizable metal constituents (iron, nickel, copper, aluminum, zinc, and/or tin) of the present invention, metal halides, particularly those in which the halide moiety is chlorine, are considered to be a preferred class of salt materials.

The invention contemplates metal-coated substrate chaff articles having utility in the radio frequency regime of the electromagnetic spectrum (electromagnetic radiation frequencies of up to 9 GigaHertz) as well as chaff articles having utility in the millimeter wave range of the electromagnetic spectrum, e.g., in the vicinity of 35 GigaHertz, or higher frequencies.

The millimeter wave radiation chaff article preferably comprises a fiber substrate having a diameter in the range of from 2 to 15 micrometers, more preferably in the range of from about 3 to 12 micrometers, and a length on the order of the half-wavelength of the millimeter wave radiation against which the chaff is effective, to provide an effective dipole for radiation absorbance and/or reflectance. The fiber substrate is coated with a coating of a metal such as aluminum, with the metal coating being doped with a suitable salt, as hereinabove described, thereby rendering the metal coating oxidatively evanescent in exposure to atmospheric moisture conditions, so that a transient millimeter wave radiation absorbance or reflectance is achieved.

Figure 28:
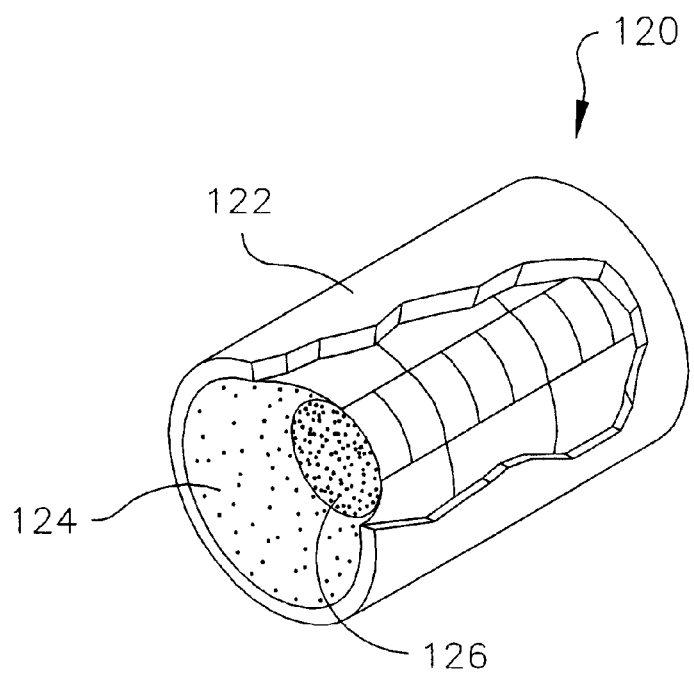
FIG. 28 is a schematic perspective view of a chaff dispensing assembly comprising a cartridge containing I band and K band chaff fibers, for electromagnetic radiation absorption and/or reflectance of radio frequency and millimeter wave frequency radiation.

FIG. 28 is a schematic perspective view of a chaff dispensing assembly 120 comprising a cartridge 122 containing I band chaff fibers 124 and K band chaff fibers 126, for electromagnetic radiation absorption and/or reflectance of radio frequency and millimeter wave frequency radiation, respectively. The I band fibers and K band fibers may be "bundled" together as shown, with the cross-section of the cartridge comprising a first discrete region of I band fibers and a second discrete region of K band fibers, or the respective I band and K band fibers may be interspersed with one another or arranged discretely or intermixedly with one another in any other suitable manner effective for the desired radiation-interactive mode of operation desired for the chaff articles.

The chaff cartridge is suitably hermetically sealed prior to use, so as to prevent the ingress to the chaff packaged therein of any atmospheric gases and moisture. The chaff may be packaged in the cartridge under inert or non-oxidative atmosphere, e.g., under argon or nitrogen gas blanket, to preserve the radiation response capacity of the chaff articles prior to their use.

In use, the chaff dispensing assembly cartridge 122 may for example be deployed by means of a suitable disperser unit (not shown) in which the chaff in the cartridge may be propelled therefrom into the chaff exposure locus. The chaff exposure locus may for example be a high altitude aerial locus, with the chaff cartridge being utilized in a chaff dispenser mounted on an aircraft, for propulsion from the cartridge into the aerial locus. Alternatively, the chaff cartridge may be deployed from a ground-based gun, launcher, or other installation (not shown), for dispersion of the chaff fibers into a terrestrial locus, such as a near-ground theatre of battle operations.

Figure 29:
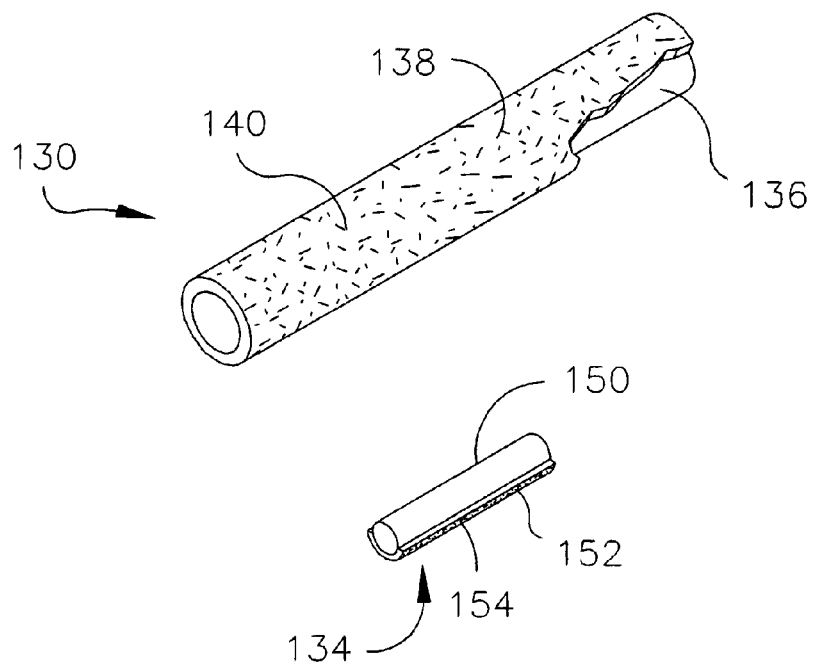
FIG. 29 is a perspective view in side-by-side relationship, of I band and K band chaff fibers, as employed in the FIG. 28 chaff dispensing assembly.

FIG. 29 is a perspective view in side-by-side relationship, of an I band chaff fiber 130 and a K band chaff fiber 134, as may for example be employed in the FIG. 28 chaff dispensing assembly 120. The I band chaff fiber 130 as shown comprises a fiber substrate 136 which may be of a suitable glass material, or alternatively may comprise a water-soluble material such as polyvinylalcohol, whereby the chaff after evanescently displaying electromagnetic attenuation character is degradable in the environmental locus in which it ultimately becomes reposed. The I band fiber may have a diameter of for example 5 to 45 microns, and a length appropriate based on half-dipole dimensional considerations to the radio frequency electromagnetic radiation which is desired to be attenuated with the chaff.

The fiber substrate 136 has coated on its outer surface, about the entire circumference thereof, a metal coating 138 which may for example be on the order of 0.05 to 2.0 microns in thickness. The metal coating 138 in turn is advantageously doped with a salt 140 such as sodium chloride or iron chloride, e.g., a 0.04% by weight iron (III) chloride, based on the weight of the metal coating, or other suitable salt which is enhancingly effective for promoting high rate oxidation of the metal coating in exposure to atmospheric moisture (relative humidity) conditions.

The K band fiber 134 comprises a fiber substrate element 150 which is half-coated with a metal coating 152 doped with a suitable salt 154. The half-coat of metal may be effected by dipping of the fiber substrate element in a molten metal bath with the surface tension and meniscus of the metal at the surface of the bath serving to adhere the metal film to the substrate element upon contact of the fiber with the metal melt surface.

In a specific embodiment of the fibers shown in FIG. 29, the fiber 130 may have a diameter of 25 microns, with the metal film 138 being on the order of one micron in thickness. The fiber 134 may have a diameter of 12 microns, with a metal coating thickness also on the order of one micron. Such a combination of fibers may be employed to provide a desired radar reflectance characteristic at specific frequencies (e.g., 9 and 35 GigaHertz) in the radiation frequency range of 1 to 140 GigaHertz.

Figure 30:
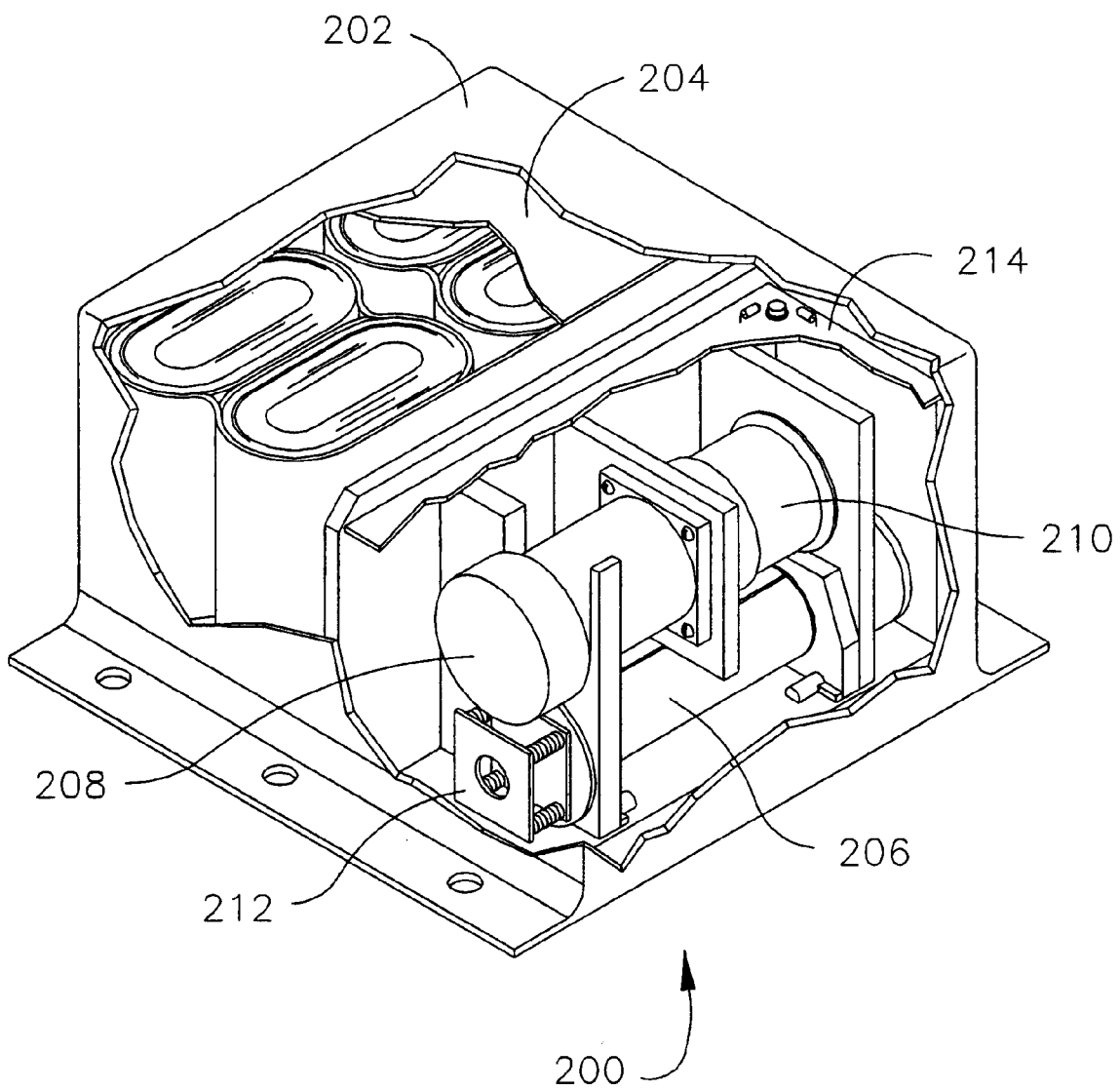
FIG. 30 is a cutter-type chaff dispenser for dissemination of chaff fibers to a chaff exposure locus from packages of chaff roving.

FIG. 30 is a cutter-type chaff dispenser 200 for dissemination of chaff fibers to a chaff exposure locus from packages 204 of chaff roving. As shown, the dispenser comprises a housing 202 which mounts the chaff roving packages 204 in supply relationship to a cutter roller 206 equipped with brake 212 and driven by drive motor 208 coupled in turn to drive clutch 210, with the disperser being controlled automatically by suitable microprocessor or other control means including circuit board 214. In operation, the dispenser is actuated to furnish chaff roving from the supply rolls in packages 204 to the cutter roller 206 for cutting of the chaff roving into the desired fiber lengths. As mentioned the dispenser may be automatically operated by control means, and such means may be programmed to provide a selected length of the chaff fibers, or the chaff fibers may be selectively cut from the roving in differing lengths so that the desired electromagnetic interactive character is achieved. Chaff cutter devices similar to that shown in FIG. 30 are commercially available, including the Lundy Mini-Cutter chaff roving cutting apparatus commercially available from Lundy Division of Advanced Technology Materials, Inc. (Danbury, Conn.).

Chaff of the foregoing types, either discrete pre-packaged chaff as shown in FIGS. 28 and 29, or chaff formed to the desired length at the point of use by a cutter dispensing device as shown in FIG. 30, can be utilized to provide a reliable degree of protection for high RCS (radar cross-section) targets.

The chaff fibers of the invention may include radiation absorbing as well as radiation scattering fibers which are active within the millimeter wave portion of the spectrum.

Such chaff may employ fine diameter fiber substrates (e.g., of 3.0 to 7.0 $\mu$m diameter) to reduce dipole settling rates. The chaff may be deployed in the form of multifilament tows of fiber which are chopped or otherwise cut to the appropriate length charactertics at the location of use.

Figure 31:
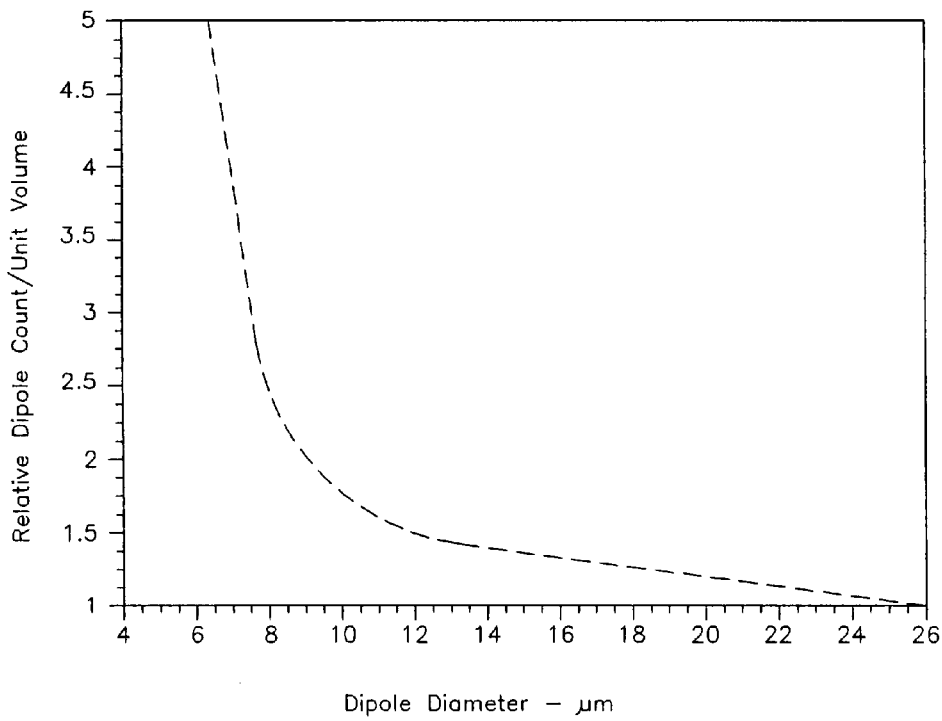
FIG. 31 is a graph of volumetric dipole packing (relative dipole count per unit volume) as a function of fiber diameter for a chaff according to the present invention.

Considering the packaging of chaff fiber articles as shown in FIG. 28, at constant package volume, dipole loading varies inversely with the square of fiber diameter. As shown in FIG. 31, which is a graph of volumetric dipole packing (relative dipole count per unit volume) as a function of fiber diameter, this means that replacing a 25.4 $\mu$m diameter fiber with a 18 $\mu$m fiber multiplies the dipole count by 2, 12.7 $\mu$m- by 4, 8.5 $\mu$m- by 9, 6.4 $\mu$m- by 16, etc. Thus, two layers of 25.4 $\mu$m diameter chaff dipoles can be replaced by one layer of 12.5 $\mu$m diameter fibers without loss of radar response, even if each dipole is only half as effective.

Figure 32:
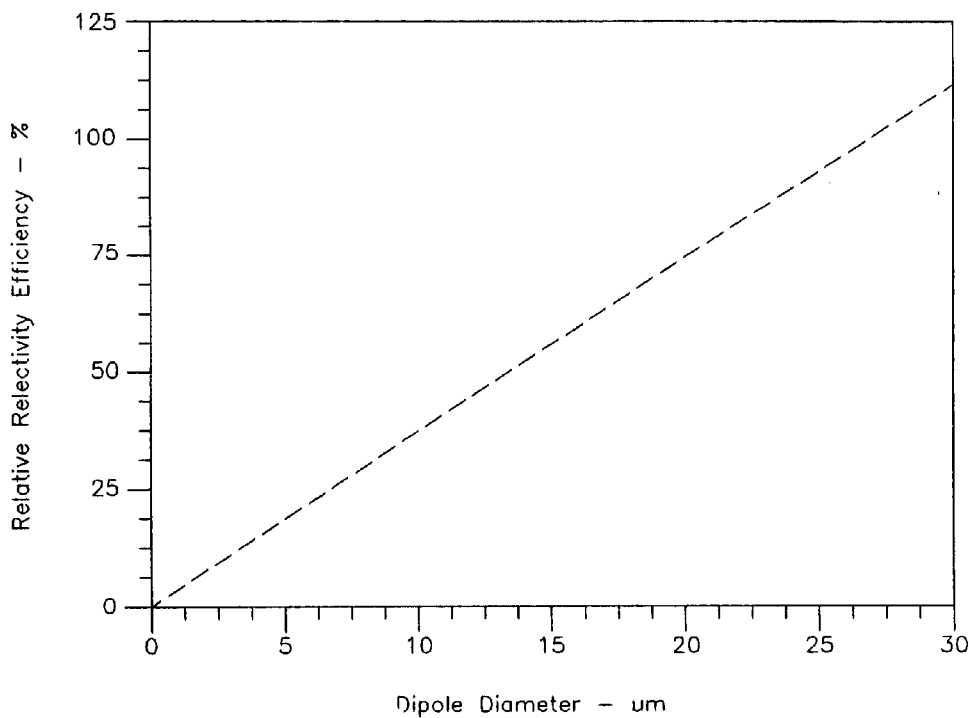
FIG. 32 is a graph of relative reflectivity efficiency, in percent, as a function of dipole diameter, in microns, for a chaff according to the present invention.

FIG. 32 is a graph of relative reflectivity efficiency, in percent, as a function of dipole diameter, in microns, for a chaff according to the present invention. This graph shows the reduction of dipole response as diameter is decreased with constant metal content. At an equivalent percentage weight metal loading (relative to the weight of the fiber substrate), a single 181 $\mu$m diameter fiber will yield ~71% the response of the 25.4 $\mu$m fiber, ~50% the response of the 12.5 $\mu$m fiber, and ~39% of the response of the 10.0$\mu$m fiber.

Figure 33:
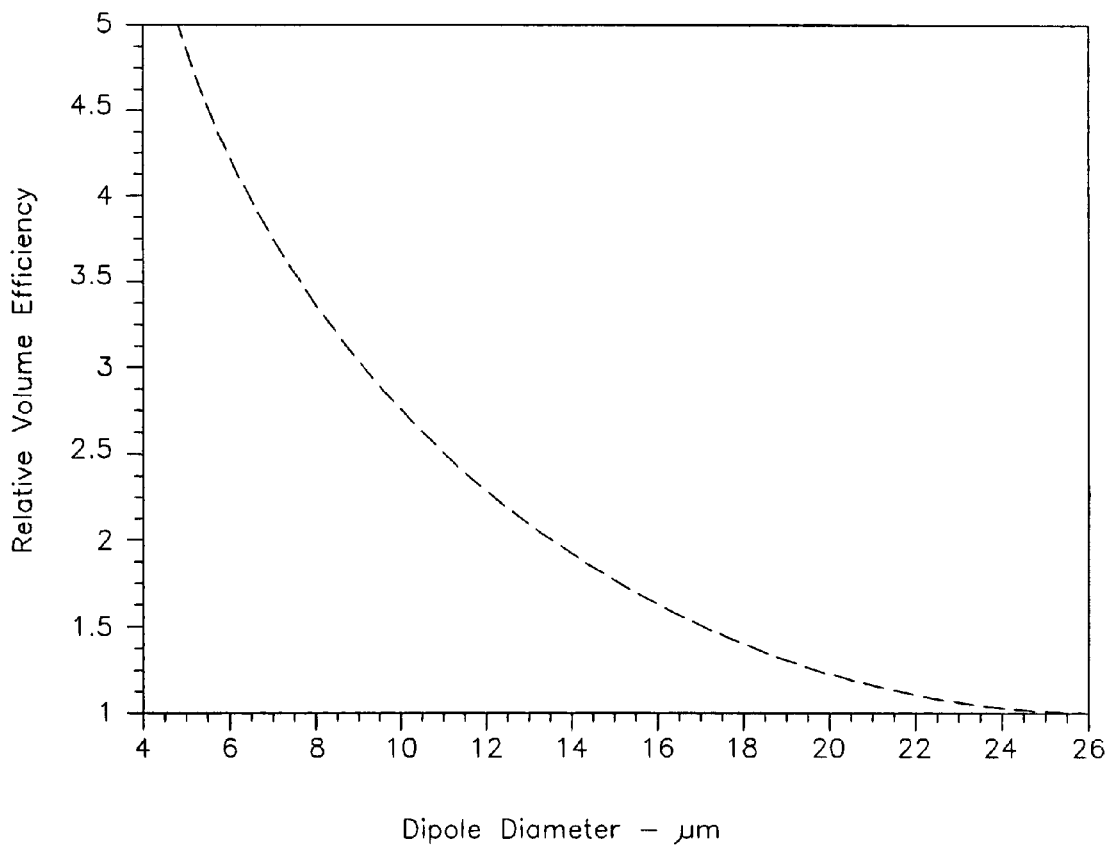
FIG. 33 is a graph of chaff relative volume efficiency as a function of dipole diameter, in microns, for a chaff according to the present invention.

Despite the reduction in reflectivity for individual dipoles of finer diameter, the greater packing efficiency in the chaff cartridge containing the precut chaff articles will yield an improved volumetric radar response for the fibers. FIG. 33 shows the enhancement of radar response per unit volume as fiber diameter is decreased. This allows reduction of existing chaff layers and addition of new dipole lengths in the chaff cartridge without loss of radar response, relative to a cartridge containing chaff fiber articles constructed and arranged for radio frequency chaff usage.

The invention thus contemplates a chaff dissemination assembly for disseminating to a selected chaff exposure locus a quantity of millimeter wave radiation chaff articles of the above-described type, optionally in combination with a quantity of a radio frequency radiation chaff articles. The chaff dissemination assembly may comprise a housing or container holding the chaff articles, as shown in FIG. 28, which is adapted to be utilized with an ejector mechanism whereby the chaff articles are introduced in finely dispersed form to the chaff exposure locus. Such an article may for example comprise I band and K band radar chaff articles, as shown and described in connection with FIG. 29. Alternatively, the chaff dissemination assembly may comprise a cutter apparatus of a type as shown for example in FIG. 30, for cutting chaff precursor articles in the theatre of use, and contemporaneously distributing the resultingly cut chaff articles to the chaff exposure locus.

The millimeter wave chaff of the present invention may be employed in current chaff cartridges by substitution or "stuffing." In chaff cartridges where there are more I band dipoles than are needed, a simple substitution, e.g., of 4 K band layers for one I band, is possible. In certain cartridges, where there are few I band cuts available for substitution, smaller diameter fiber, e.g., 12 micron diameter fiber cut to I band chaff fiber lengths, can be substituted for remaining layers of I band chaff, thus substantially increasing the number of dipoles provided by the chaff cartridge.

Stuffing involves increasing the packing density of the chaff. Standard chaff dipoles typically are packaged within circular or square cross-section tubes to only 60% of their theoretical density. Co-packaging over-wrapped shorter dipoles along with longer dipoles thus affords higher density of chaff in the package and the enhancement of extended response to electromagnetic radiation, in the millimeter wave range, as well as in the radio frequency range.

The features and advantages of the present invention are more fully shown with reference to the following non-limiting example, wherein all parts and percentages are by weight, unless otherwise expressly stated.

EXAMPLE I

A calcium aluminoborosilicate fiberglass roving material (E-glass, Owens-Corning D filament), comprising glass filaments of approximately 4.8 microns measured diameter and a density of approximately 2.6 grams per cubic centimeter, was desized under nitrogen atmosphere to remove the size coating therefrom, at a temperature of approximately 700° C. Following desizing, the filament roving at a temperature of approximately 500° C. was passed through a chemical vapor deposition chamber maintained at a temperature of 110° C. The chemical vapor deposition chamber contained 10% iron pentacarbonyl in a hydrogen carrier gas. The fiber roving was passed through heating and coating deposition zones in sequence, for a sufficient number of times to deposit a coating of elemental iron at approximately 0.075 micron thickness on the fiber substrate of the roving filaments.

Subsequent to iron coating formation, the roving was passed through a solution bath containing 2% by weight of iron (III) chloride in methanol solution, under nitrogen atmosphere. The roving then was passed through a drying oven at a temperature of approximately 100° C. under nitrogen atmosphere, to remove the methanol solvent and leave a salt coating of iron (III) chloride on the iron film. The salt-doped, iron-coated roving then was packaged under nitrogen atmosphere in a moisture-proof package.

EXAMPLE II

Figure 34:
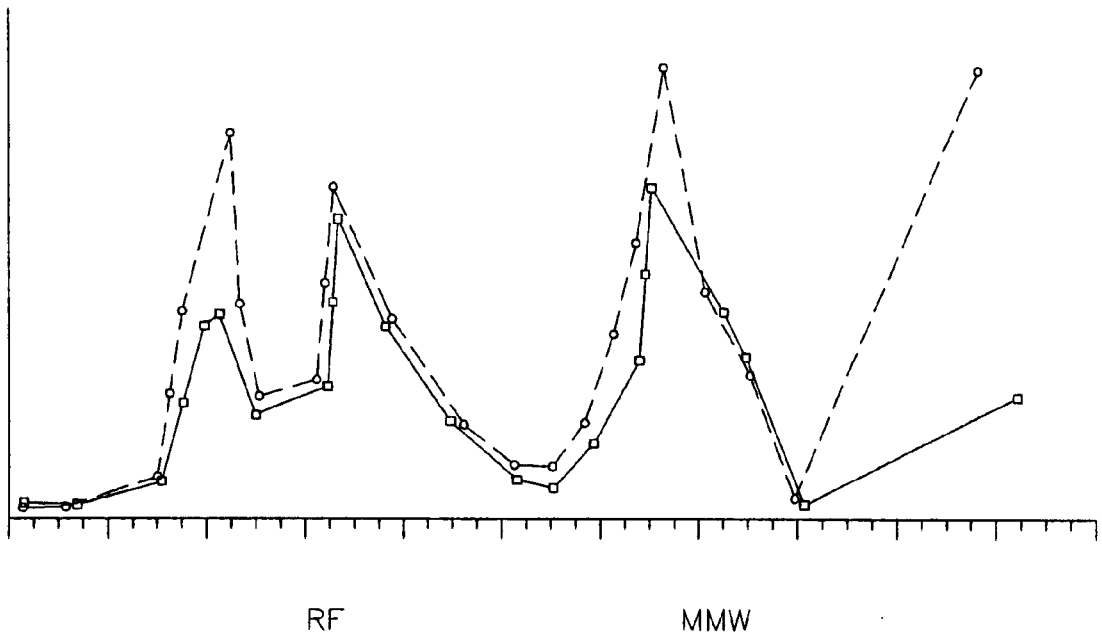
FIG. 34 is a graph of radar cross-section (RCF) as a function of electromagnetic radiation frequency, including radio frequency (RF) and millimeter wave (MMW) frequency, for an aluminum coated glass fiber chaff ("Standard") and a millimeter wave chaff according to the present invention ("MMW Modified").

A standard cartridge of I band training chaff comprising 25 micron diameter glass fiber coated with 1 micron thick aluminum coatings about the entire outer circumferential surface of the fiber substrate was tested comparatively against a corresponding modified cartridge in which one layer of I band chaff was replaced with 4 layers of K band chaff comprising 12 micron diameter glass fibers on which only one side of the fibers was coated with aluminum. When these cartridges were flight tested, no degradation in standard performance was noted, and an order of magnitude increase in K band response was achieved. The test results, after one minute of dispense time, are shown in FIG. 34, which is a graph of radar cross-section (RCF) as a function of electromagnetic radiation frequency, including radio frequency (RF) and millimeter wave (MMW) frequency, for the aluminum coated glass fiber chaff ("Standard") and for the millimeter wave chaff according to the present invention ("MMW Modified").

These test results evidence the unobviousness of the millimeter wave chaff according to the present invention. Based on prior work and anecdotal experiences, small diameter fibers, e.g., on the order of 12 micron diameter fibers, were thought to provide no substantial benefit as a chaff substrate, relative to larger diameter fibers. Smaller diameter fibers on the order of 12 microns diameter, also were expected to become tangled and intermeshed during their dissemination and they therefore were not expected to yield good radar cross-sections. Such small fiber diameters were also thought to be structurally inadequate to withstand the pyrotechnic dissemination blasts utilized to disperse chaff articles from cartridges of the type shown in FIG. 28. Further, half-coat fibers (i.e., fibers coated over only a portion of their circumference with metal) were believed to have insufficient metal available for good radar return in a radar reflectance mode of operation. Additionally, half-coated fibers were believed to be difficult to disseminate due to adhesion or frictional forces at glass-glass interfaces between neighboring filaments in the multifilament arrays employed in chaff cartridges or fiber tows.

Unexpectedly, however, none of these problems was evident in that good radar cross section values were measured not only in the milliseconds after dissemination, but also at longer times of one minute.

While preferred and illustrative embodiments of the invention have been described, it will be appreciated that numerous modifications, variations, and other embodiments are possible, and accordingly, all such apparent modifications, variations, and embodiments are to be regarded as being within the spirit and scope of the present invention.

What is claimed is:

1. An article comprising a non-conductive substrate having coated thereon an oxidizable metal coating doped with a salt from about 0.005% to about 25% by weight based on the weight of the oxidizable metal in the oxidizable metal coating to constitute a salt-doped oxidizable metal coating that oxidizes at an oxidation rate that is greater than that of a corresponding oxidizable metal that is not salt-doped.

2. An article according to claim 1, wherein the substrate comprises an environmentally degradable material.

3. An article according to claim 1, wherein the substrate comprises a material selected from the group consisting of glass, polymeric, ceramic, pre-oxidized carbon, and non-conductive carbon materials.

4. An article according to claim 1, wherein the substrate comprises a material selected from the group consisting of cotton, wool, silk, hemp, hair, flax, mohair, ramie, unrefined cellulosics, nylon, rayon, polyester, polyetherimide, polyethylene, polyphenylenesulfide, polyetherketone, polylactic acid, acetate, starch doped polyethylene, modified polybutylene terephthalate, hydrolyzable nylon, chitosan, chitosan acetate, polyglycolic acid, polycaprolactone, sugar, and polyvinyl alcohol.

5. An article according to claim 1, wherein the substrate comprises glass.

6. An article according to claim 1, wherein the salt-doped oxidizable metal coating comprises aluminum-coated iron.

7. An article according to claim 1, wherein the substrate is in a form selected from the group consisting of filaments, fibers, microbeads, microballoons, hollow fibers, powders, flakes, and ribbons.

8. An article according to claim 1, wherein the substrate and salt-doped oxidizable metal coating are constructed and arranged to exhibit an electromagnetic radiation absorbing character.

9. An article according to claim 1, wherein the substrate and salt-doped oxidizable metal coating are constructed and arranged to exhibit a millimeter wave absorbing character.

10. An article according to claim 1, wherein the salt-doped oxidizable metal coating comprises an underlying iron coating and an overlying aluminum coating.

11. The article according to claim 1 wherein the oxidizable metal coating is selected from the group consisting of iron, aluminum, copper, zinc, tin and nickel.

12. The article according to claim 1 wherein the oxidizable metal coating comprises a mixture of at least two oxidizable metals selected from the group consisting of iron, aluminum, copper, zinc, tin and nickel.

13. The article according to claim 1 wherein the oxidizable metal coating comprises aluminum.

14. The article according to claim 1 wherein the salt used to dope the oxidizable metal is selected from the group consisting of metal halide, metal sulfate, metal nitrate, metal citrate, metal stearate and metal acetate.

15. The article according to claim 1 wherein the salt used to dope the oxidizable metal is selected from the group consisting of lithium chloride, sodium chloride, zinc chloride, iron (III) chloride and copper sulfate.

16. An article according to claim 1, wherein the substrate is dimensionally sized and coated with metal to produce an electromagnetic radiation response in the 1–140 GigaHertz range of the electromagnetic spectrum, and wherein the electromagnetic radiation response is evanescent in exposure to ambient relative humidity conditions.

17. An article according to claim 1, wherein the salt-doped oxidizable metal coating consists essentially of an underlying iron coating and an overlying aluminum coating.

18. An article according to claim 1 wherein the oxidizable metal coating is doped with a salt at a loading of from about 0.1 to 25% based on the weight of the oxidizable metal in the oxidizable metal coating.

19. An article comprising a non-conductive substrate having coated thereon an oxidizable metal coating doped with a salt including a cation metal different from the metal of the oxidizable metal coating, the salt being present at from about 0.005% to about 25% by weight based on the weight of oxidizable metal in the oxidizable metal coating to constitute a salt-doped oxidizable metal coating, the salt being effective to accelerate the rate of oxidation of the oxidizable metal in the salt-doped oxidizable metal coating under oxidation conditions therefor.

20. An article comprising a non-conductive substrate having coated thereon an oxidizable metal coating doped with an amount of a salt that provides the article with an electromagnetic radiation response for a duration of from about 30 to about 60 minutes, when the article is exposed to (i) atmospheric humidity and (ii) radio frequency or millimeter wavelength electromagnetic radiation.

21. An article comprising a non-conductive substrate having coated thereon an oxidizable metal coating doped with a salt to constitute a salt-doped oxidizable metal coating that oxidizes at an oxidation rate that is greater than an oxidation rate of a corresponding oxidizable metal that is not salt-doped, and wherein $R_{10}/R_0 \geq 100$ wherein $R_{10}$ is a 10 minute change in resistance of the salt-doped oxidizable metal coating at 50% relative humidity, and $R_0$ is an initial four-point resistance of the salt-doped oxidizable metal coating prior to atmospheric exposure, with $R_{10}$ and $R_0$ being measured in same units of measurement.

22. An article comprising a non-conductive substrate having coated thereon an oxidizable metal coating doped with a salt that forms either a discontinuous layer on the surface of the metal or is dispersed within the metal layer or both, and wherein the salt is present in an amount from about 0.005% to about 25% by weight based on the weight of the oxidizable metal in the oxidizable metal coating to constitute a salt-doped oxidizable metal coating that oxidizes at an oxidation rate that is greater than that of a corresponding oxidizable metal that is not salt-doped.

\* \* \* \* \*

UNITED STATES PATENT AND TRADEMARK OFFICE
CERTIFICATE OF CORRECTION

PATENT NO: 6,017,628
DATED: January 25, 2000
INVENTOR(S): Stevens et al.

Figure 24A:
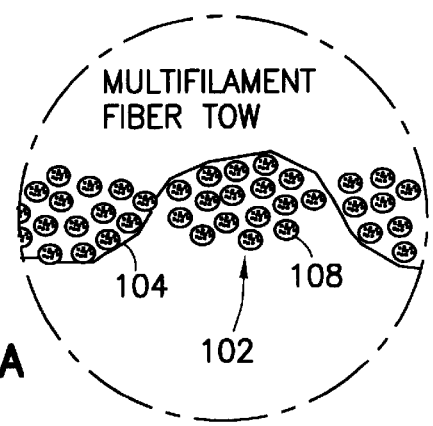

It is certified that error appears in the above-identified patent and that said Letters Patent is hereby corrected as shown below:

Column 7, line 14, insert -- Fig. 24A is an enlarged view of a cross-section of the multifilament fiber tow of Fig. 24. --

Column 18, line 22, after "advantage" insert --. --.

Column 27, line 35, after "shown" insert -- in Fig. 24A --.

Column 28, line 17, change "exposure time," to -- exposure time. --.

Column 28, line 21, "However, doping" should not start a new paragraph.

Column 32, line 47, change "181 μm" to -- 18 μm --.

Signed and Sealed this

Sixth Day of February, 2001

*Attest:*

Q. TODD DICKINSON

*Attesting Officer*    *Director of Patents and Trademarks*